(12) United States Patent
Yoshida

(10) Patent No.: US 8,817,316 B2
(45) Date of Patent: Aug. 26, 2014

(54) PRINTING METHOD AND PRINTING APPARATUS

(75) Inventor: Masahiko Yoshida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1096 days.

(21) Appl. No.: 12/384,136

(22) Filed: Apr. 1, 2009

(65) Prior Publication Data

US 2009/0244605 A1 Oct. 1, 2009

(30) Foreign Application Priority Data

Apr. 1, 2008 (JP) ................................. 2008-095260

(51) Int. Cl.
*G06K 15/00* (2006.01)
*G06F 3/12* (2006.01)

(52) U.S. Cl.
USPC .......................... 358/1.18; 358/1.12; 358/1.15

(58) Field of Classification Search
None
See application file for complete search history.

(56) References Cited

U.S. PATENT DOCUMENTS

| 5,214,442 | A | * | 5/1993 | Roller ........................... 347/102 |
| 5,371,531 | A | * | 12/1994 | Rezanka et al. ................ 347/43 |
| 5,966,145 | A | | 10/1999 | Miura et al. |
| 6,031,974 | A | | 2/2000 | Takahashi et al. |
| 6,068,374 | A | | 5/2000 | Kurata et al. |
| 7,419,255 | B2 | | 9/2008 | Kawaguchi et al. |
| 2004/0036726 | A1 | * | 2/2004 | Zach ............................... 347/12 |
| 2004/0104987 | A1 | * | 6/2004 | Smith et al. .................... 347/101 |
| 2004/0252173 | A1 | * | 12/2004 | Ben-Zur et al. ............... 347/101 |
| 2006/0158473 | A1 | * | 7/2006 | Mills et al. ...................... 347/15 |

FOREIGN PATENT DOCUMENTS

| JP | 06-278275 A | 10/1994 |
| JP | 07-214768 A | 8/1995 |
| JP | 07-312696 A | 11/1995 |
| JP | 2003-118136 | 4/2003 |
| JP | 2005-014445 A1 * | 1/2005 |
| JP | 2005-138398 A | 6/2005 |
| JP | 2005-161583 A | 6/2005 |
| JP | 2006-289716 A | 10/2006 |

* cited by examiner

*Primary Examiner* — King Poon
*Assistant Examiner* — Vincent Peren
(74) *Attorney, Agent, or Firm* — Nutter McClennen & Fish LLP; John J. Penny, Jr.; Rory P. Pheiffer

(57) ABSTRACT

There is provided a method of printing a plurality of printing materials on a medium for producing a printing material in which a second image is printed on a first image. The method includes alternately repeating printing the first image in a first area included in a print area and printing the second image in a second area that is included in the print area and is located on the downstream side of the first area in the transport direction, based on image data that includes the first image and the second image that are printing targets, and transporting the first image that is printed in the first area to the second area.

13 Claims, 31 Drawing Sheets

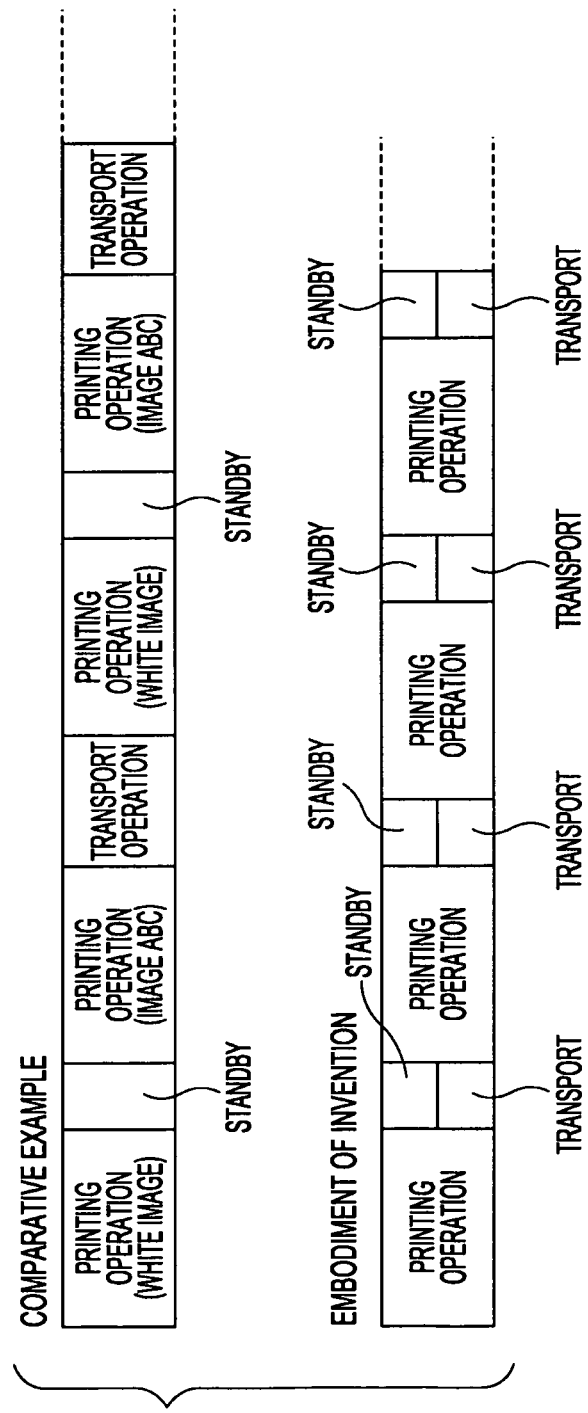

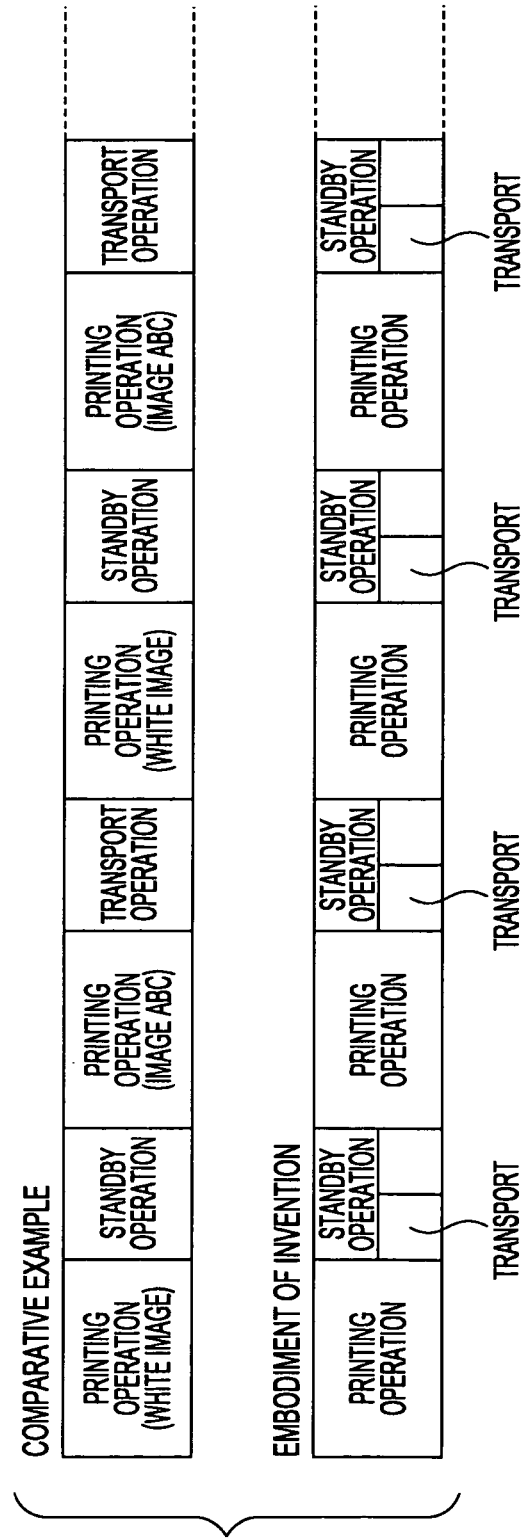

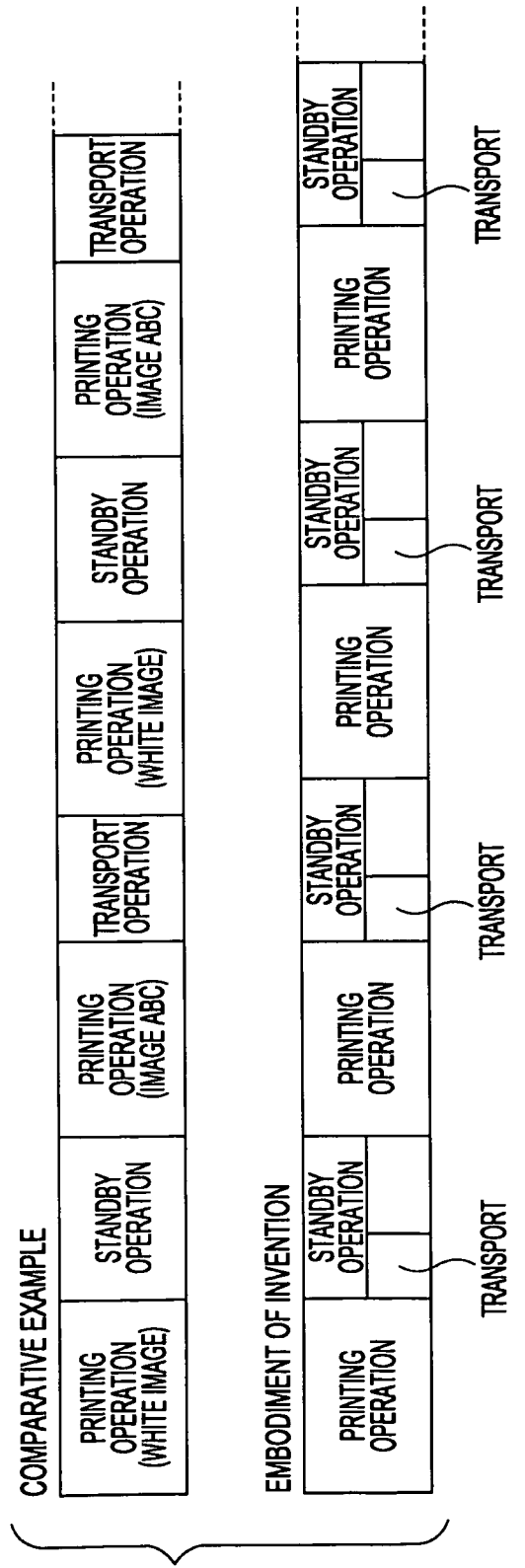

PRINTING METHOD AND PRINTING APPARATUS

BACKGROUND

1. Technical Field

The present invention relates to a printing method and a printing apparatus.

2. Related Art

As a printing apparatus that prints a plurality of printing materials on a medium having a long form, a printing apparatus that is disclosed in JP-A-2003-118136 has been known.

In this printing apparatus, a plurality of printing materials is printed on the medium by alternately repeating a printing operation and a transport operation. In the printing operation, a plurality of images is printed in a print area. In addition, in a transport operation, a part for which the printing operation is completed is discharged outside the print area, and a part for which the printing operation is not performed is transported to the print area.

However, there is a case where a printing material is desired to be produced by overlapping a plurality of images on a medium. In such a case, when a different image is printed for each printing operation, image data for each printing operation needs to be prepared, and thereby the image data to be stored is increased.

SUMMARY

An advantage of some aspects of the invention is that it provides a printing method and a printing apparatus capable of reducing the amount of the image data to be stored.

According to a major aspect of the invention, there is provided a method of printing a plurality of printing materials on a medium for producing a printing material in which a second image is printed on a first image. The method includes alternately repeating: printing the first image in a first area included in a print area and printing the second image in a second area that is included in the print area and is located on the downstream side of the first area in the transport direction, based on image data that includes the first image and the second image that are printing targets; and transporting the first image that is printed in the first area to the second area.

Other aspects of the invention will become apparent by referring to descriptions here and the accompanying drawings.

BRIEF DESCRIPTION OF THE DRAWINGS

The invention will be described with reference to the accompanying drawings, wherein like numbers reference like elements.

FIG. 8A is an explanatory diagram of the processing time for a case where the standby time of the comparative example is shorter than the transport time of the comparative example.

FIG. 8B is an explanatory diagram of the processing time for a case where the standby time of the comparative example is the same as the transport time of the comparative example.

FIG. 8C is an explanatory diagram of the processing time for a case where the standby time of the comparative example is longer than the transport time of the comparative example.

DESCRIPTION OF EXEMPLARY EMBODIMENTS

Overview of Disclosure

Figure 1:
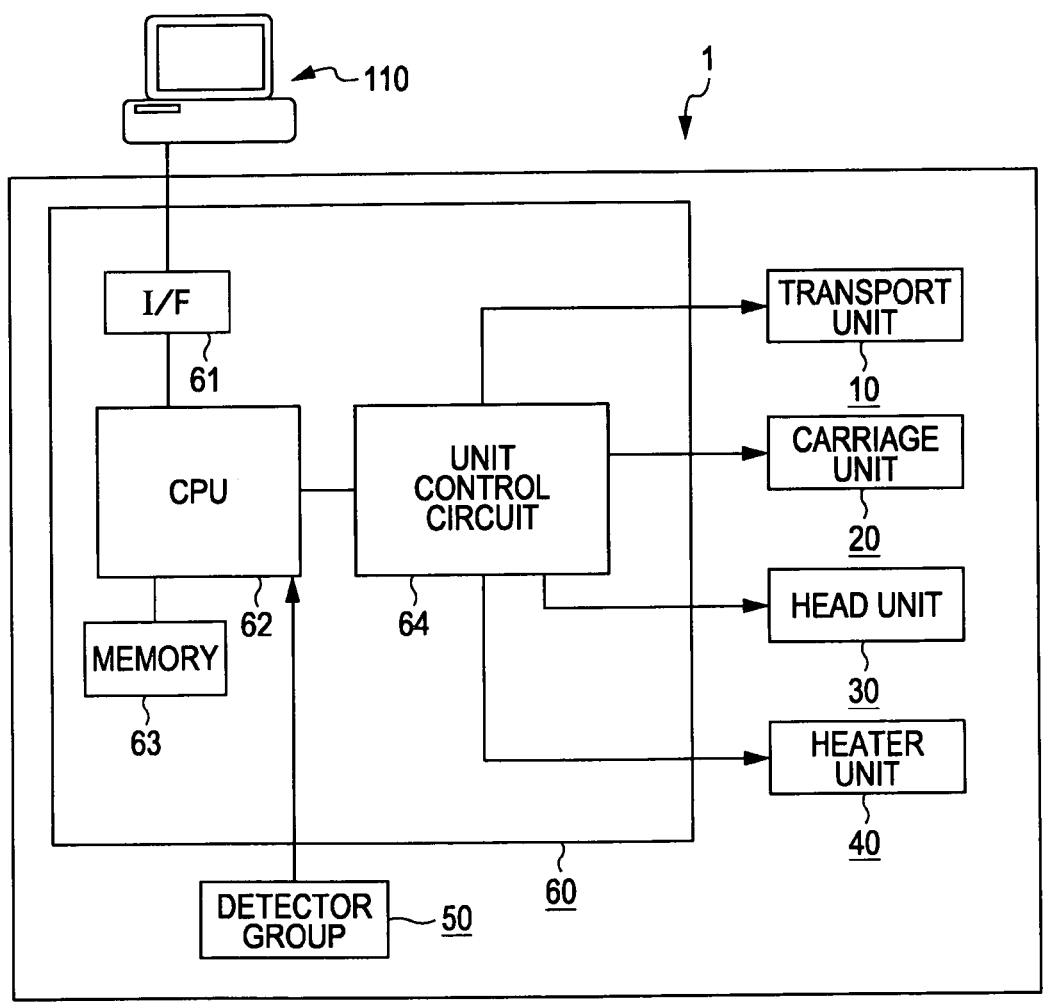
FIG. 1 is a block diagram showing the whole configuration of a printer 1 according to an embodiment of the invention.

At least the followings become apparent by referring to descriptions here and the accompanying drawings.

According to a first aspect of the invention, there is provided a method of printing a plurality of printing materials on a medium for producing a printing material in which a second image is printed on a first image. The method includes alternately repeating: printing the first image in a first area included in a print area and printing the second image in a second area that is included in the print area and is located on the downstream side of the first area in the transport direction, based on image data that includes the first image and the second image that are printing targets; and transporting the first image that is printed in the first area to the second area.

According to the above-described method, the amount of the image data to be stored can be decreased.

In the above-described method, it is preferable that the image data includes at least one between a plurality of the first images and a plurality of the second images, and the printing material in which at least one between the first image and the second image is printed on the first image, and the second image is printed thereon is produced by alternately repeating the printing of the first and second images and the transporting of the first image. In such a case, at least one of the images can be formed to be thick.

In addition, in the above-described method, it is preferable that one between the first image and the second image is a background image, and the other between the first image and the second image is an image for using the background image as background. In such a case, the background image is included, and accordingly, the image can be seen more easily.

In addition, in the above-described method, it is preferable that the image data includes a third image that is different from the first and second images, the third image is printed in a third area that is included in the print area and is located on the downstream side of the second area in the transport direction in the printing of the first and second images, and the printing material in which the third image is printed on the second image is produced by alternately repeating the printing of the first and second images and the transporting of the first image. In such a case, a printing material that is configured by at least three-layered images can be produced.

In addition, in the above-described method, it is preferable that the second image is a background image, and the first image is an image to be seen from a side of the medium that is opposite to the printing face side. In such a case, a printing material that can supply images to be seen from both sides without reversing the medium can be produced.

In addition, in the above-described method, it is preferable that the image data includes a plurality of the second images, and the third image is printed on the plurality of the printed second images. In such a case, a printing material for which when the first image is viewed, the third image cannot be easily transmitted to be seen, and, when the third image is viewed, the first image cannot be easily transmitted to be seen can be produced.

In addition, in the above-described method, it is preferable that the plurality of the second images has different dot forming positions. In such a case, the drying time in the printing operation can be shortened.

In addition, in the above-described method, it is preferable that, in the image data, an interval between the second image and the third image is different from an interval between the first image and the second image. In such a case, the drying time can be set appropriately.

In addition, in the above-described method, it is preferable that the first image is transported from the first area to an area disposed between the first area and the second area by the transporting of the first image, and the first image is transported from the area between the first area and the second area to the second area by the transporting of the first image thereafter. In such a case, the second image can be printed after the first image is dried.

In addition, in the above-described method, it is preferable that a drying device that dries the printing material is disposed on the downstream side of the print area in the transport direction, and the drying device can change a drying range. In such a case, power consumption can be reduced.

In addition, in the above-described method, it is preferable that a support unit that dries the printing material with supporting the medium is disposed in the print area. In such a case, the time until the second image is printed after the first image is printed can be shortened.

According to a second aspect of the invention, there is provided a printing apparatus including: a memory that stores image data including a first image and a second image as printing targets; a printing unit that performs printing for a medium based on the image data; a transport unit that transports the medium in the transport direction; a controller that alternately repeats: printing the first image in a first area included in a print area and printing the second image in a second area that is included in the print area and is disposed on the downstream side of the first area in the transport direction based on the image data by using the printing unit; and transporting the first image printed in the first area to the second area by using the transport unit.

According to the above-described printing apparatus, the amount of the image data to be stored in the memory can be decreased.

Configuration of Printer

<Configuration of Printer>

Figure 2:
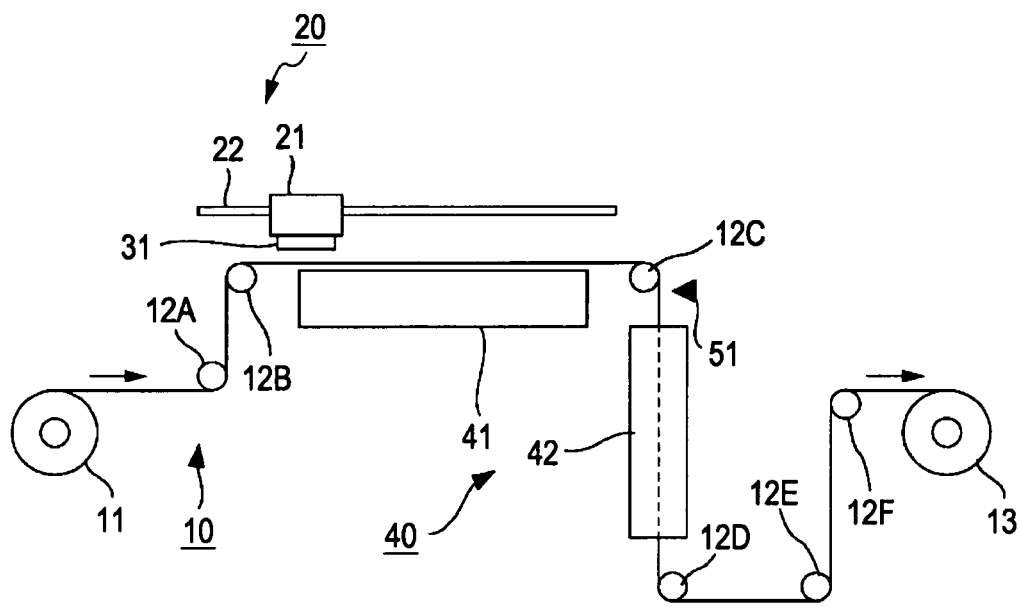
FIG. 2 is a schematic diagram showing the whole configuration of the printer 1.
Figure 3:
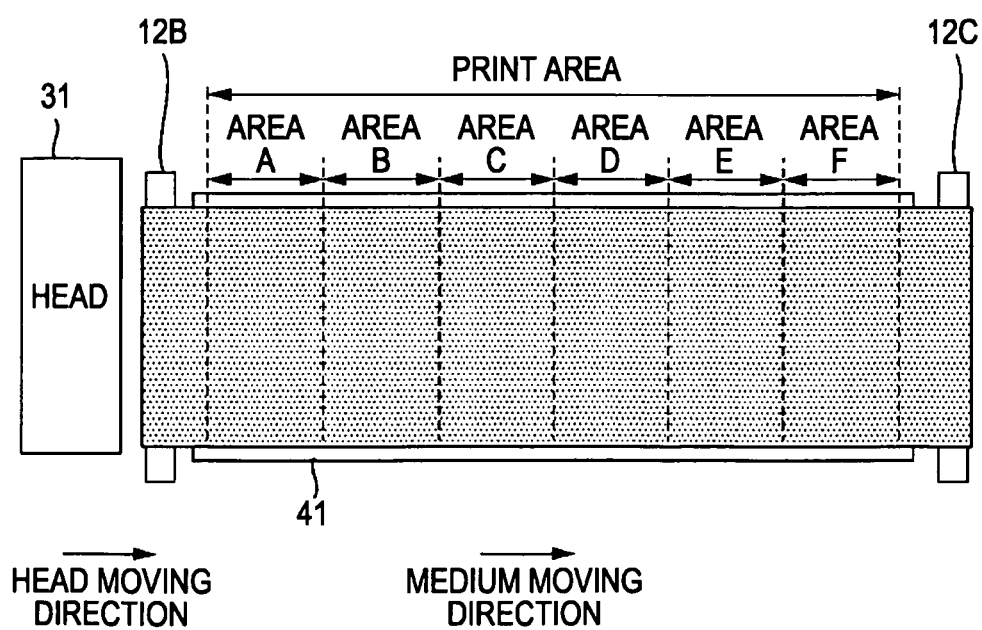
FIG. 3 is an explanatory diagram showing the vicinity of a print area.

FIG. 1 is a block diagram showing the whole configuration of a printer 1 according to an embodiment of the invention. In addition, FIG. 2 is a schematic diagram showing the whole configuration of the printer 1. FIG. 3 is an explanatory diagram showing the vicinity of a print area. Hereinafter, a basic configuration of the printer according to this embodiment will be described.

The printer 1 includes a transport unit 10, a carriage unit 20, a head unit 30, a heater unit 40, a detector group 50, and a controller 60. The printer 1 that receives print data from a computer 110 as an external device controls the above-described units (the transport unit 10, the carriage unit 20, the head unit 30, and the heater unit 40) by using the controller 60. The controller 60 prints an image on a paper sheet by controlling each unit based on the print data that is received from the computer 110. The state of the printer 1 is monitored by the detector group 50, and the detector group 50 outputs a detection result to the controller 60. The controller 60 controls each unit based on the detection result that is output from the detector group 50.

The transport unit 10 is used for transporting a roll-shaped medium (for example, a roll paper sheet, a roll-shaped sealing sheet, or the like) in a predetermined direction (hereinafter, referred to as a transport direction). This transport unit 10 includes a feed mechanism 11, transport rollers 12A to 12F, and a winding mechanism 13. The transport rollers 12A to 12B transport a medium that is fed from the feed mechanism 11 to a print area and transports the medium printed in the print area to the winding mechanism 13. As the controller 60 controls a transport motor not shown in the figure, the rotation amounts of the transport rollers 12A to 12F are controlled, and whereby the transport amount of the medium is controlled.

The carriage unit 20 is used for moving a head in a moving direction. The carriage unit 20 includes a carriage 21 that moves in a predetermined direction (the moving direction) and a guide 22 that guides the carriage 21 in the moving direction. The controller 60 controls a carriage motor not shown in the figure, whereby controlling the movement of the carriage 21. In addition, in the printer according to this embodiment, the moving direction of the carriage 21 is the same as the transport direction of the medium transported by the transport unit 10.

The head unit 30 includes a head 31 that discharges ink onto a paper sheet. The head 31 is mounted on the carriage 21. Thus, when the carriage 21 moves in the moving direction, the head 31 is also moved in the moving direction. On the lower face of the head 31, a nozzle row is disposed along the medium width direction. This nozzle row is disposed over a length corresponding to the width of the medium. The head 31 discharges ink while moving in the moving direction, and thereby the medium is printed in the print area.

Although not shown in the figure, on the lower face of the head 31, nozzle rows that discharge ink of colors such as a cyan color, a magenta color, a yellow color, a black color, and the like are disposed. In addition, on the lower face of the head 31, a nozzle row that discharges ink of a white color, a nozzle row that discharges a fixing agent, a nozzle row that discharges a coating agent, and the like are disposed.

The heater unit 40 includes a hot platen 41 and a drying mechanism 42. The hot platen 41 supports a medium in the print area and has a heater built therein. Accordingly, by heating a medium on the print area, drying a printed image on the print area is accelerated. The drying mechanism 42 is disposed on the downstream side of the print area. Thus, by heating a medium printed in the print area, drying the printing material is accelerated outside the print area. The maximum heating range of the drying mechanism 42 is equal to or wider than a range corresponding to the print area. However, the heating range of the drying mechanism 42 can be changed by the controller 60. For example, the printing material can be heated by using only a range corresponding to three areas (for example, areas A to C shown in FIG. 3). In a case where only the range corresponding three areas is heated, power consumption of the drying mechanism 42 is lower than that of a case where a range corresponding to the print area (six areas shown in FIG. 3) is heated.

In addition, the hot platen 41 and the drying mechanism 42 may be any device that can dry a printed image on a medium or a printing material. For example, the hot platen 41 and the drying mechanism 42 may be devices that apply warm wind or electromagnetic waves such as infrared rays, ultraviolet rays, or microwaves to the medium.

In the detector group 50, for example, a mark detecting sensor 51 is included. The mark detecting sensor 51 is used for detecting a mark that is printed on a medium. Based on the detection result, the transport amount of the medium transported by the transport unit 10 is controlled. In addition, the detector group 50 includes an encoder for detecting the rotation amounts of the transport rollers 12A to 12F, a linear-type encoder for detecting the position of the moving direction of the carriage 21, and the like in addition to the mark detecting sensor 51.

The controller 60 is a control unit (control part) for controlling the printer. The controller 60 includes an interface unit 61, a CPU 62, a memory 63, and a unit control circuit 64. The interface unit 61 performs an operation for transmitting and receiving data between the computer 110 as an external device and the printer 1. The CPU 62 is an arithmetic processing unit for performing a control operation for the entire printer 1. The memory 63 is used for acquiring an area for storing a program of the CPU 62, a work area, and the like. In addition, in the memory 63, image data to be printed is stored. The CPU 62 performs printing process to be described later by controlling each unit through the unit control circuit 64 in accordance with the program that is stored in the memory 63. The CPU 62 prints an image represented by the image data on a medium by discharging ink or the like from each nozzle (not shown in the figure) of the head 31 in accordance with the image data that is stored in the memory 63.

When the printing process is performed, the printer 1 prints printing materials on the medium with equally spaced by alternately repeating a transport operation for transporting a medium in the transport direction by using the transport unit 10 and a printing operation for printing an image on the medium by discharging ink from the head 31 based on the image data with the head 31 moved by the carriage unit 20. The printing materials, to be described later, are printed with a plurality of images overlapped with one another.

In description below, a print area is divided into six areas, and images are printed in each area. Six areas are areas A, B, C, D, E, and F that are sequentially disposed from the upstream side in the transport direction (see FIG. 3).

In addition, the number of divisions of the print area is not limited to six. In addition, the range of the print area is changed in accordance with the size of the printing material and needs not to be the maximum printable range (the movable range of the carriage 21) of the printer 1.

First Embodiment

Printing Material of First Embodiment

Figure 4:
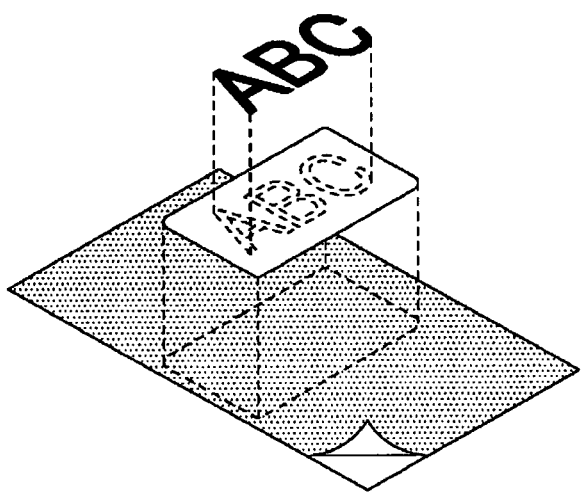
FIG. 4 is an explanatory diagram of a printing material according to a first embodiment of the invention.

FIG. 4 is an explanatory diagram of a printing material according to a first embodiment of the invention.

A medium is configured by a sealing member (base member) having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member or an opaque member. In addition, the medium may not be configured by a sealing sheet and may be a transparent film that does not have any adhesive face or a paper sheet.

This printing material is acquired by printing two images so as to be overlapped with each other on the medium. An image that is printed first on the medium is a rectangular image (hereinafter, referred to as a "white image") that is formed by coating white ink. In addition, an image that is printed on the white image is a character image of "ABC" (hereinafter, referred to as an "image ABC"). In other words, this printing material is acquired from forming a first layer of the white image and a second layer of the image ABC so as to be overlapped with each other on the medium.

Comparative Example

Figure 5:
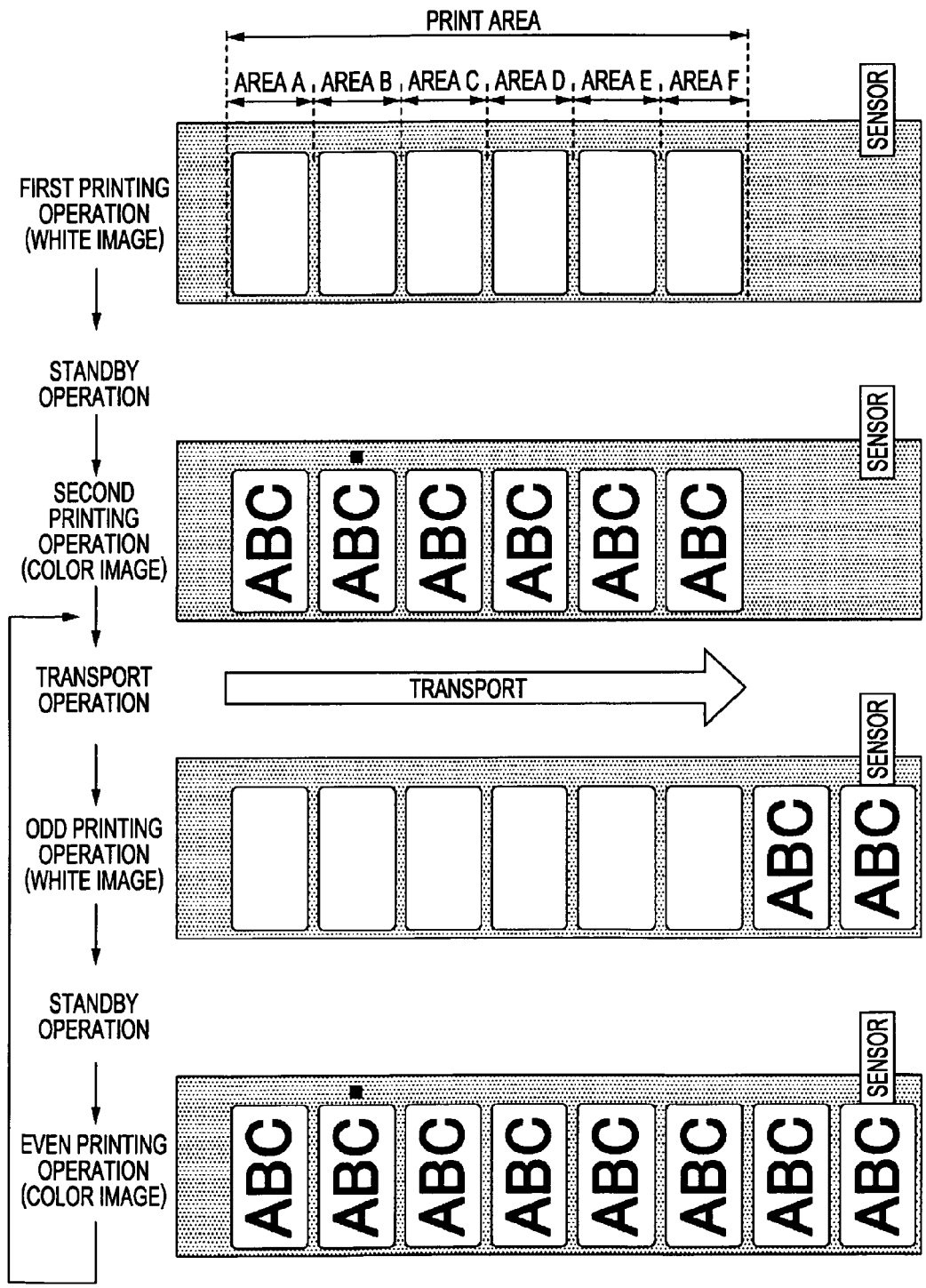
FIG. 5 is an explanatory diagram of a printing method according to the comparative example.

Before a printing method according to this embodiment is explained, a comparative example will be described. FIG. 5 is an explanatory diagram of a printing method according to the comparative example.

According to the comparative example, in a first printing operation, the printer 1 prints six white images in each area while moving the head 31 in the moving direction.

After the first printing operation is performed (after the white images are printed), the printer 1 stands by until the white images printed on the medium are dried (a standby operation). The reason is that when the image ABC is printed before the white images are dried, the image ABC spreads.

After the standby operation, the printer 1 performs a second printing operation. In the second printing operation, the printer 1 prints six images ABC in each area while moving the head 31 in the moving direction. In each area, the white image has been printed already, and accordingly, the image ABC is printed so as to be overlapped with the white image. By performing the second printing operation, six printing materials are completed in the print areas. In addition, in the second printing operation, a mark is printed in an area B.

After performing the second printing operation, the printer 1 transports the medium by a transport amount corresponding to a length of six printing materials (a transport operation). When the medium is transported until the mark printed in the area B in the above-described second printing operation is detected by a sensor, a transport operation for a transport amount corresponding to the length of six printing materials is completed. By performing this transport operation, a medium on which any image is not printed is transported to the print area. Accordingly, a next printing operation can be performed without performing any standby operation.

After performing the transport operation, the printer 1 performs an odd-number-th printing operation (for example, a third printing operation). In the odd-number-th printing operation, the printer 1 prints six white images in each area. After performing the odd-number-th printing operation (after the white images are printed), the printer 1 performs a standby operation. After performing the standby operation, the printer 1 performs an even-number-th printing operation (for example, a fourth printing operation). In the even-number-th printing operation, the printer 1 prints six images ABC in each area. After performing the even-number-th printing operation, the printer 1 performs a transport operation for transporting the medium by a transport amount corresponding to a length of six printing materials. By repeating the above-described operations, the printing materials are printed on the medium with equally spaced.

In the comparative example, for every even-number-th printing operation, six printing materials are completed. In other words, on average, three printing materials are completed for each one printing operation.

Printing Method According to First Embodiment

Figure 6:
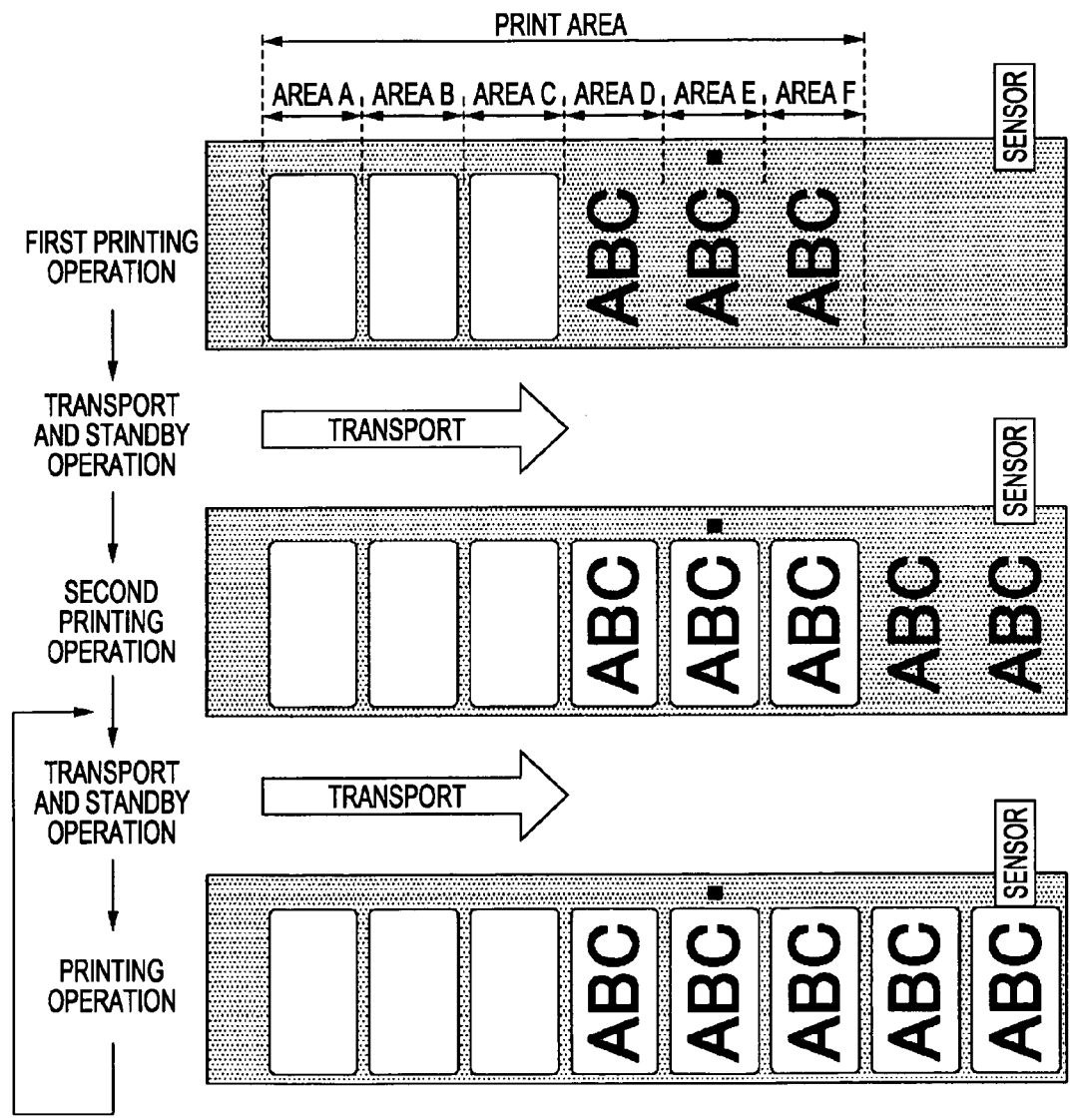
FIG. 6 is an explanatory diagram of a printing method according to a first embodiment of the invention.

FIG. 6 is an explanatory diagram of a printing method according to a first embodiment of the invention. As described below, according to the first embodiment, a printer repeats a printing operation for printing white images in the areas A to C and printing images ABC in the areas D to F and a transport operation of a transport amount corresponding to a length of three printing materials.

First, in a first printing operation, the printer 1 prints white images in areas A to C while moving the head 31 in the moving direction. In addition, the printer 1 prints images ABC in areas D to F that are located on the downstream side of the areas A to C in the transport direction. In addition, in the first printing operation, a mark is printed in the area E.

After the first printing operation is performed, the printer 1 transports the medium by a transport amount corresponding to a length of three printing materials (transport operation). When the medium is transported until the mark that is printed in the area E in the above-described first printing operation is detected by the sensor, a transport operation of a transport amount corresponding to the length of three printing materials is completed. This transport operation is performed as a standby operation for drying the white images, as well. By performing this transport operation, a medium on which any image has not been printed is transported to the areas A to C, and the white images that have been printed in the areas A to C in the first printing operation are transported to the areas D to F.

In the second printing operation, the printer 1, same as in the first printing operation, prints white images in the areas A to C and prints images ABC in the areas D to F. However, in the second printing operation, there are the white images, which are printed in the first printing operation, in the areas D to F. Accordingly, by performing the second printing operation, three printing materials are completed in the areas D to F.

After performing the second printing operation, by alternately repeating the same transport operation and the same printing operation, the printing materials are printed on the medium with spaced equally. In addition, by performing the second and subsequent printing operations, white images are printed in the areas A to C, and three printing materials are completed in the areas D to F. In addition, by performing the second and subsequent transport operations, a medium on which any image is not printed is transported to the areas A to C, and the white images printed in the areas A to C in the previous printing operation are transported to areas D to F.

According to the first embodiment, three printing materials are completed for each printing operation.

<Comparison>

Figure 7A:
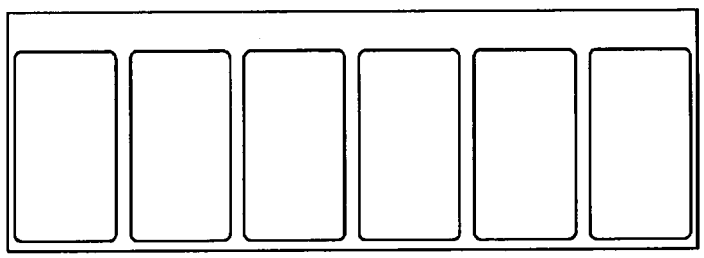
FIG. 7A is an explanatory diagram of image data for an odd-number-th printing operation according to a comparative example.
Figure 7B:
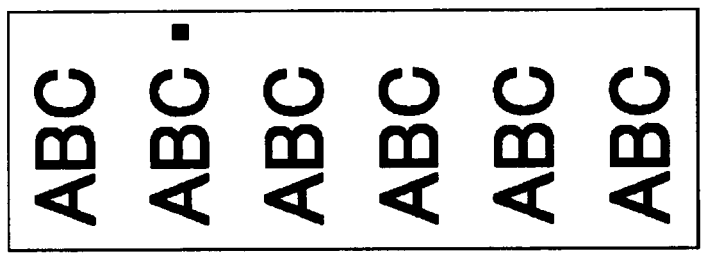
FIG. 7B is an explanatory diagram of image data for an even-number-th printing operation according to the comparative example.

FIG. 7A is an explanatory diagram of image data for an odd-number-th printing operation according to the comparative example. FIG. 7B is an explanatory diagram of image data for an even-number-th printing operation according to the comparative example. The image data for the odd-number-th printing operation includes six white images to be printed in the areas A to F. In addition, the image data for the even-number-th printing operation includes six images ABC to be printed in the areas A to F.

In the comparative example, between the odd-number-th operation and the even-number-th operation, images to be printed in the print areas are different. Accordingly, in the memory 63 of the printer 1, two types of image data need to be stored.

Figure 7C:
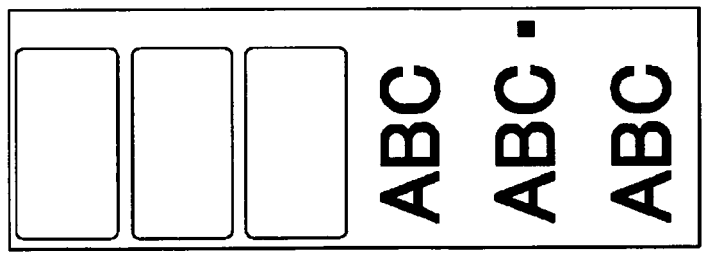
FIG. 7C is an explanatory diagram of image data that is used for the printing operation according to the first embodiment.

FIG. 7C is an explanatory diagram of image data that is used for the printing operation according to the first embodiment. The image data that is used for the printing operation according to the first embodiment includes three white images to be printed in the areas A to C and three images ABC to be printed in the areas D to F. In addition, the image data includes a mark to be printed in the area E, as well.

According to the first embodiment, in all the printing operations, images to be printed in the print areas are the same. Accordingly, in the memory 63 of the printer 1, only one type of the image data is stored.

In other words, according to this embodiment, compared to the comparative example, a storage amount needed for storing data of images (image data) to be printed in the print area can be decreased.

Next, the processing time and the processing speed of the comparative example and those of the first embodiment will be compared. In descriptions below, the transport amount of the transport operation according to the first embodiment is smaller than that according to the comparative example, and thus, the transport time according to the first embodiment is shorter than that according to the comparative example. In addition, the standby time (drying time) required for printing the images ABC after white images are printed is the same for the comparative example and the first embodiment.

FIG. 8A is an explanatory diagram of the processing time for a case where the standby time of the comparative example is shorter than the transport time of the comparative example. In such a case, as shown in the figure, the printing process of the first embodiment can print more printing materials in a short time than that of the comparative example.

FIG. 8B is an explanatory diagram of the processing time for a case where the standby time of the comparative example is the same as the transport time of the comparative example. In such a case, as shown in the figure, the speed of the printing process of the comparative example and the speed of the printing process of the first embodiment are almost the same level. In addition, from this figure, it can be understood that the first embodiment is more advantageous than the comparative example for a case where the standby time of the comparative example is shorter than the transport time of the comparative example.

FIG. 8C is an explanatory diagram of the processing time for a case where the standby time of the comparative example is longer than the transport time of the comparative example. In such a case, as shown in the figure, the printing process of the comparative example can print more printing materials in a short time than that of the first embodiment.

As described above, when the standby time of the comparative example is shorter than the transport time of the comparative example, the printing process according to the first embodiment is more effective than that of the comparative example. According to this embodiment, by disposing the hot platen 41 in the printer 1, the standby time can be set to be shorter than the transport time.

In addition, the transport amount of the transport operation according to the first embodiment is a half that according to the comparative example. Accordingly, the drying mechanism 42 (see FIG. 2) of the comparative example needs to heat the medium in a range corresponding to the print area. However, the drying mechanism 42 of the first embodiment needs to heat the medium only in a range corresponding to three areas (for example, areas A to C), and accordingly, power consumption can be decreased.

Modified Example

Figure 9:
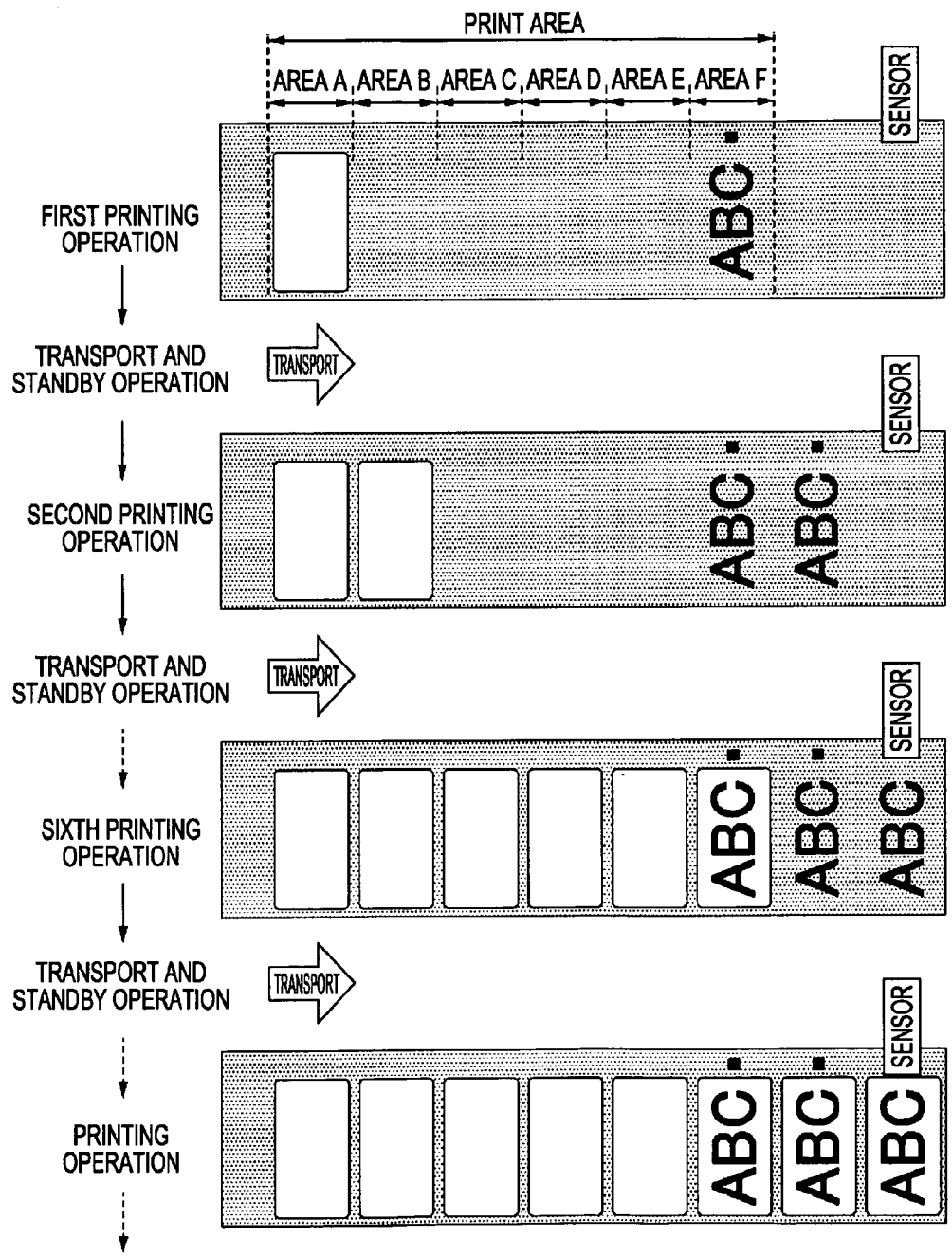
FIG. 9 is an explanatory diagram of a modified example of the first embodiment.

FIG. 9 is an explanatory diagram of a modified example of the first embodiment. As described below, in this modified example, the printer repeats a printing operation for printing a white image in the area A and printing an image ABC in the area F and a transport operation of a transport amount corresponding to a length of one printing material.

First, in a first printing operation, the printer 1 prints a white image in the area A while moving the head 31 in the moving direction. In addition, the printer 1 prints an image ABC in the area F that is located on the downstream side of the area A in the transport direction. At this moment, any image is not printed in the areas B to E. In addition, in the first printing operation, a mark is printed in the area F.

After the first printing operation is performed, the printer 1 transports the medium by a transport amount corresponding to a length of one printing material (transport operation). By performing this transport operation, a medium on which any image has not been printed is transported to the area A, and a white image that has been printed in the area A in the first printing operation is transported to the area B.

In the second printing operation, the printer 1, same as in the first printing operation, prints a white image in the area A and prints an image ABC in the area F. At this moment, any image is not printed in areas B to E. After the second printing operation, the printer 1 alternately repeats the same transport operation and the same printing operation.

Then, in the sixth printing operation, the printer 1, the same as in the first printing operation, prints a white image in the area A and prints an image ABC in the area F. However, in the sixth printing operation, there is the white image in the area F that is printed in the first printing operation. Accordingly, by performing the sixth printing operation, one printing material in the area F is completed.

In this modified example, one printing material is completed for each printing operation.

In this modified example, as in the above-described first embodiment, an image to be printed in the print area is the same in all the printing operation. Accordingly, in the memory 63 of the printer 1, only one type of the image data is stored.

In this modified example, one printing material is printed for each printing operation. Thus, compared to the first embodiment, the printing speed may be slowed down. However, in this modified example, a time until the image ABC is printed after the white image is printed is lengthened. Accordingly, the image ABC can be printed after the white image is sufficiently dried on the hot platen 41.

The transport amount of the transport operation of this modified example is smaller than that of the first embodiment. Accordingly, in this modified example, the drying mechanism 42 may be configured to heat the medium in a range corresponding to one area (for example, the area A), and thereby power consumption can be decreased.

Second Embodiment

Printing Material of Second Embodiment

Figure 10A:
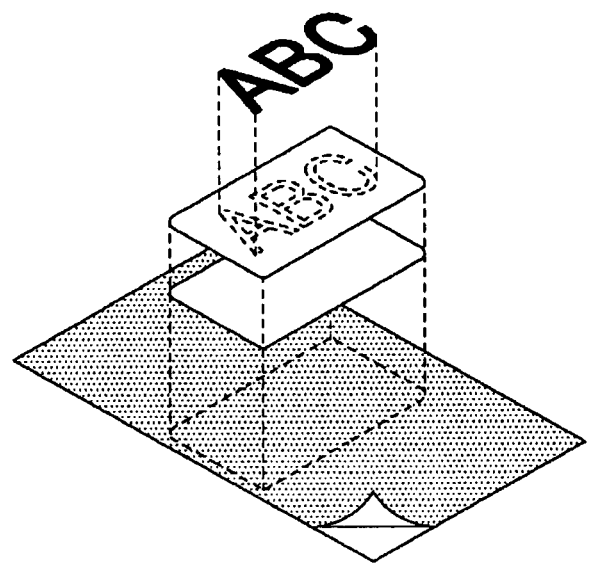
FIG. 10A is an explanatory diagram of a printing material according to a second embodiment of the invention.

FIG. 10A is an explanatory diagram of a printing material according to a second embodiment of the invention. Compared to the printing material according to the first embodiment, the number of images (the number of layers) printed on the medium is different in the second embodiment.

A medium is configured by a sealing member (base member) having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member or an opaque member.

In addition, the medium may not be a sealing sheet and may be a transparent film that does not have any adhesive face or a paper sheet.

This printing material is acquired by printing three images so as to be overlapped with one another on the medium. An image that is printed first on the medium is a white image of a first layer. An image that is printed on the white image of the first layer is a white image of a second layer. In addition, an image that is printed on the white image of the second layer is an image ABC. In other words, this printing material is acquired from forming two layers of the white images and the image ABC so as to be overlapped with each other on the medium.

According to the second embodiment, a plurality of white images is formed to be overlapped. Thus, compared to the first embodiment, the layer of the white image becomes thick. Accordingly, in the second embodiment, a background image can be printed to be thicker than that in the first embodiment. As a result, the characters "ABC" can be seen easily.

Printing Method According to Second Embodiment

Figure 10B:
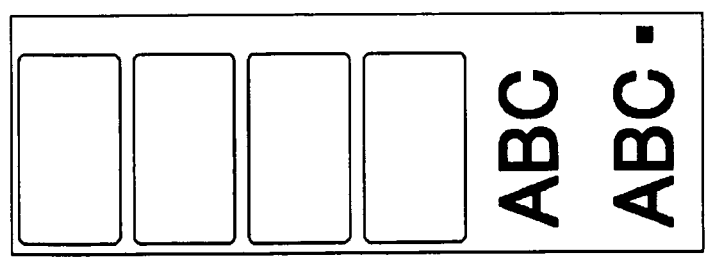
FIG. 10B is an explanatory diagram of image data that is used for a printing operation according to the second embodiment.

FIG. 10B is an explanatory diagram of image data that is used for the printing operation according to the second embodiment. As shown in the figure, the image data includes four white images to be printed in the areas A to D and two images ABC to be printed in the areas E and F. In addition, the white images printed in the areas A and B become white images of the first layer, and the white images printed in the areas C and D become the white images of the second layer. In addition, the image data also includes a mark to be printed in the area F.

Figure 11:
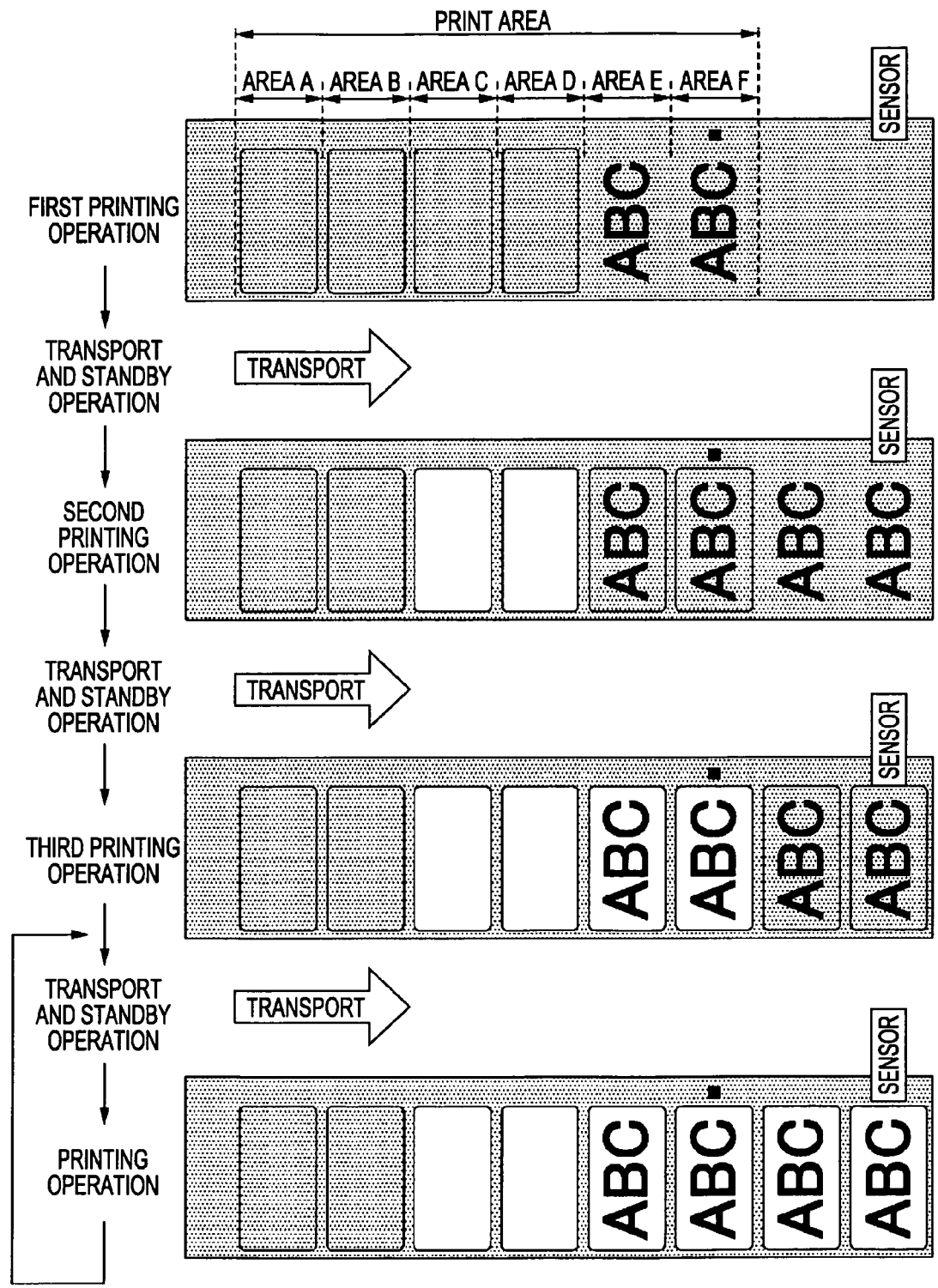
FIG. 11 is an explanatory diagram of a printing method according to the second embodiment.

FIG. 11 is an explanatory diagram of a printing method according to a second embodiment of the invention. As described below, according to the second embodiment, a printer repeats a printing operation that is performed based on the image data shown in FIG. 10B and a transport operation of a transport amount corresponding to a length of two printing materials.

First, in a first printing operation, the printer 1 prints white images in areas A to D while moving the head 31 in the moving direction. In addition, the printer 1 prints images ABC in areas E and F that are located on the downstream side of the areas A to D in the transport direction. In addition, in the first printing operation, a mark is printed in the area F.

After the first printing operation is performed, the printer 1 transports the medium by a transport amount corresponding to a length of two printing materials (transport operation). When the medium is transported until the mark that is printed in the area F in the above-described first printing operation is detected by the sensor, a transport operation of a transport amount corresponding to the length of two printing materials is completed. This transport operation is performed as a standby operation for drying the white images and the images ABC, as well. By performing this transport operation, a medium on which any image has not been printed is transported to the areas A and B, and the white images that have been printed in the areas A to D in the first printing operation are transported to the areas C to F.

In the second printing operation, the printer 1, same as in the first printing operation, prints white images in the areas A to D and prints images ABC in the areas E and F. However, in the second printing operation, there are the white images, which are printed in the first printing operation, in the areas C to F. Accordingly, by performing the second printing operation, the white images of the second layer are printed in the areas C and D, and the images ABC are printed on the white images in the areas E and F.

After the second printing operation is performed, the printer 1 transports the medium by a transport amount corresponding to a length of two printing materials (the transport operation). By performing this transport operation, a medium on which any image has not been printed is transported to the areas A and B. In addition, the white images of the first layer that are printed in the areas A and B in the second printing operation are transported to the areas C and D, and the white images of the second layer that are printed in the areas C and D in the second printing operation are transported to the areas E and F.

In the third printing operation, the printer 1, same as in the first or second printing operation, prints the white images in the areas A to D and prints the images ABC in the areas E and F. However, in the third printing operation, there are the white images of the first layer in the areas C and D, and there are the white images of the second layer in the areas E and F. Accordingly, by performing the third printing operation, the white images of the second layer are printed in the areas C and D, and two printing materials are completed in the areas E and F.

After performing the third printing operation, by alternately repeating the same transport operation and the same printing operation, the printing materials are printed on the medium with spaced equally. In addition, by performing the third and subsequent printing operations, the white images of the first layer are printed in the areas A and B, the white images of the second layer are printed in the areas C and D, and two printing materials are completed in the areas E and F. In addition, by performing the third and subsequent transport operations, a medium on which any image is not printed is transported to the areas A and B, the white images printed in the areas A and B in the previous printing operation are transported to areas C and D, and the white images of the second layer that are printed in the previous printing operation in the areas C and D are transported to the areas E and F.

According to the second embodiment, two printing materials are completed for each printing operation.

According to the second embodiment, a different printing material can be printed while the same advantages as those of the first embodiment are acquired.

Third Embodiment

Printing Material of Third Embodiment

Figure 12A:
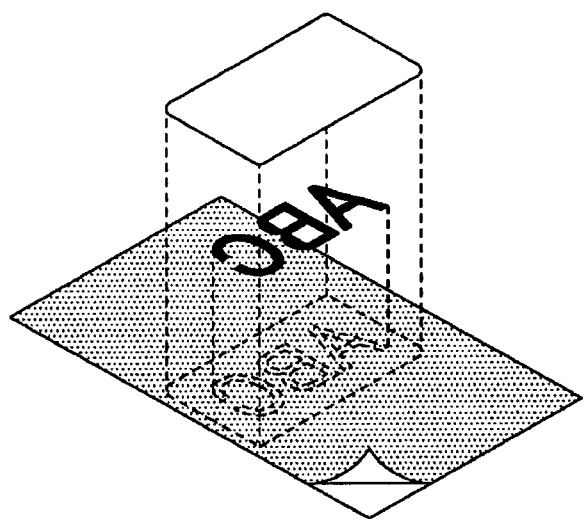
FIG. 12A is an explanatory diagram of a printing material according to a third embodiment of the invention.

FIG. 12A is an explanatory diagram of a printing material according to a third embodiment of the invention. Compared to the printing material according to the first embodiment, the order of the white images and the images ABC is different. In addition, in accordance with the order of the white images and the images ABC, the image ABC is configured to be a mirrored image.

A medium is configured by a sealing member having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member. In addition, the medium may not be a sealing sheet and may be a transparent film that does not have any adhesive face.

This printing material is acquired by printing two images so as to be overlapped with each other on the medium. An image that is printed first on the medium is a mirrored image of characters of "ABC" (hereinafter, referred to as a "mirrored image ABC"). In addition, an image that is printed on the mirrored image ABC is a white image. In other words, this printing material is acquired from forming a first layer of the mirrored image ABC and a second layer of the white image so as to be overlapped with each other.

When the peel-off member of this printing material is removed, and the adhesive face of the sealing member, for example, is attached to a window from the indoor side, characters of "ABC" can be seen from the outdoor side through the sealing member (the characters "ABC" can be seen from a side opposite to the printing face of the sealing member). When the printing material is used as described above, the sealing member is configured to be a transparent or semi-transparent member, and the image of the first layer is a mirrored image.

Printing Method According to Third Embodiment

Figure 12B:
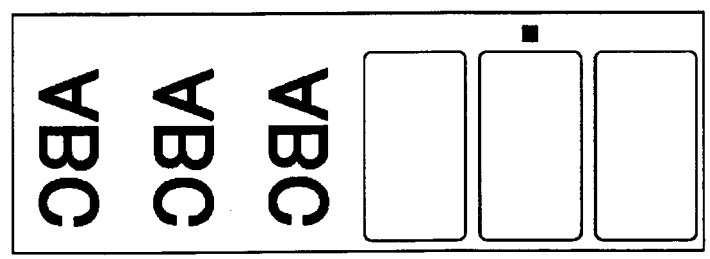
FIG. 12B is an explanatory diagram of image data that is used for a printing operation according to the third embodiment.

FIG. 12B is an explanatory diagram of image data that is used for the printing operation according to the third embodiment. As shown in the figure, the image data includes three mirrored images ABC to be printed in the areas A to C and three white images to be printed in the areas D to F. In addition, the image data also includes a mark to be printed in the area E.

Figure 13:
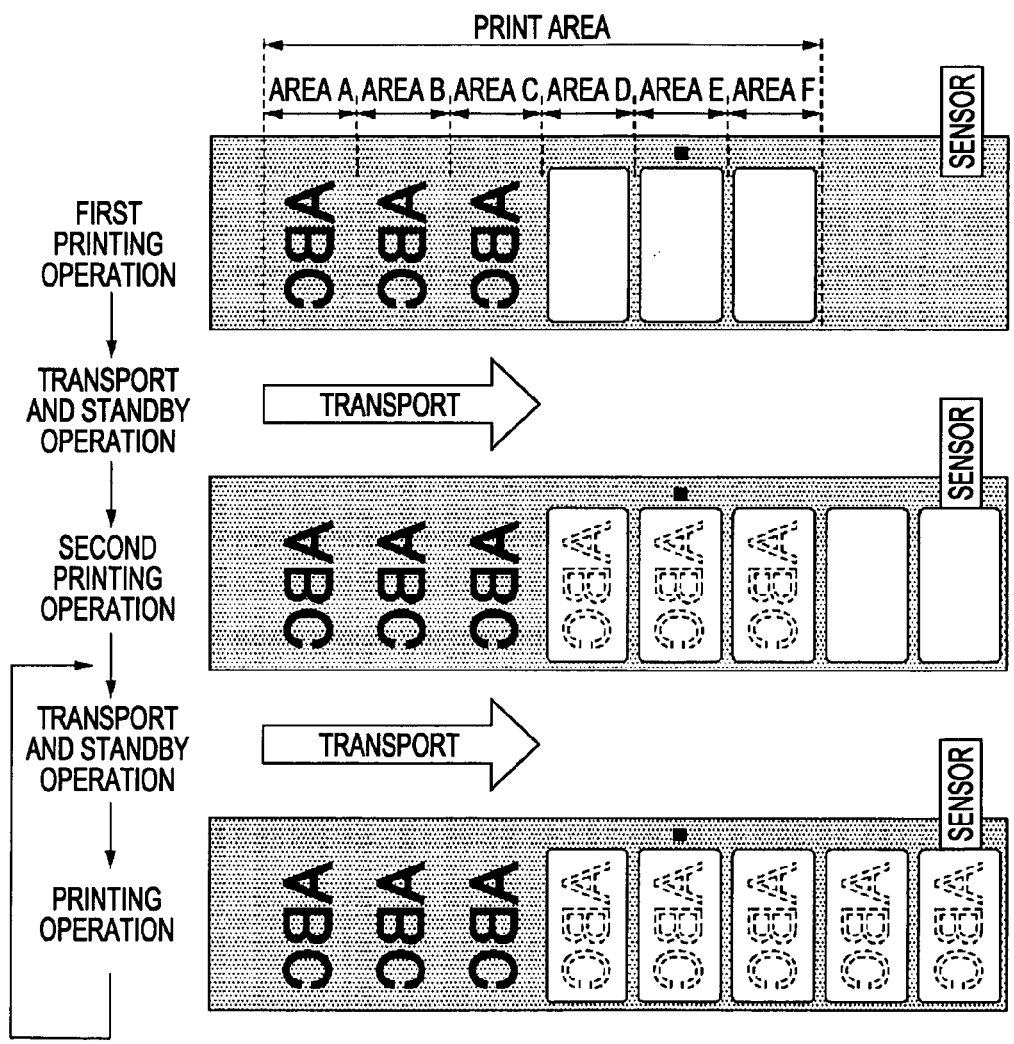
FIG. 13 is an explanatory diagram of a printing method according to a third embodiment of the invention.

FIG. 13 is an explanatory diagram of a printing method according to a third embodiment of the invention. As described below, according to the third embodiment, a printer repeats a printing operation (for printing the mirrored images ABC in the areas A to C and printing the white images in the areas D to F) that is performed based on the image data shown in FIG. 12B and a transport operation of a transport amount corresponding to a length of three printing materials.

First, in a first printing operation, the printer 1 prints mirrored images ABC in areas A to C while moving the head 31 in the moving direction. In addition, the printer 1 prints the white images in areas D to F that are located on the downstream side of the areas A to C in the transport direction. In addition, in the first printing operation, a mark is printed in the area E.

After the first printing operation is performed, the printer 1 transports the medium by a transport amount corresponding to a length of three printing materials (transport operation). When the medium is transported until the mark that is printed in the area E in the above-described first printing operation is detected by the sensor, a transport operation of a transport amount corresponding to the length of three printing materials is completed. This transport operation is performed as a standby operation for drying the mirrored images ABC, as well. By performing this transport operation, a medium on which any image has not been printed is transported to the areas A to C, and the mirrored images ABC that have been printed in the areas A to C in the first printing operation are transported to the areas D to F.

In the second printing operation, the printer 1, same as in the first printing operation, prints the mirrored images ABC in the areas A to C and prints the white images in the areas D to F. However, in the second printing operation, there are the mirrored images ABC, which are printed in the first printing operation, in the areas D to F. Accordingly, by performing the second printing operation, three printing materials are completed in the areas D to F.

After performing the second printing operation, by alternately repeating the same transport operation and the same printing operation, the printing materials are printed on the medium with spaced equally. In addition, by performing the second and subsequent printing operations, the mirrored images ABC are printed in the areas A to C, and three printing materials are completed in the areas D to F. In addition, by performing the second and subsequent transport operations, a medium on which any image is not printed is transported to the areas A to C, and the mirrored images ABC printed in the areas A to C in the previous printing operation are transported to areas D to F.

According to the third embodiment, three printing materials are completed for each printing operation. In addition, according to the third embodiment, a different printing material can be printed while the same advantages as those of the first embodiment are acquired.

Fourth Embodiment

Printing Material of Fourth Embodiment

Figure 14A:
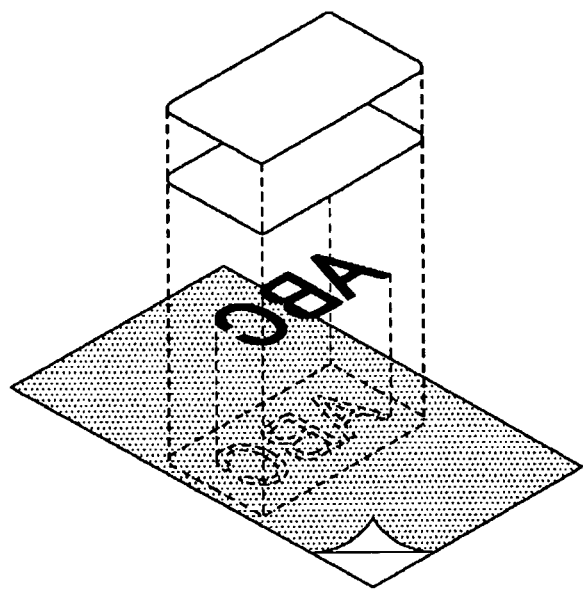
FIG. 14A is an explanatory diagram of a printing material according to a fourth embodiment of the invention.

FIG. 14A is an explanatory diagram of a printing material according to a fourth embodiment of the invention. Compared to the printing material according to the third embodiment, the number of images (the number of layers) printed on the medium is different in the fourth embodiment.

A medium is configured by a sealing member having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member. In addition, the medium may not be a sealing sheet and may be a transparent film that does not have any adhesive face.

This printing material is acquired by printing three images so as to be overlapped with one another on the medium. An image that is printed first on the medium is a mirrored image ABC. Images that are printed on the mirrored image ABC are two white images. In other words, this printing material is acquired from forming a first layer of the mirrored image ABC and second and third layers of the white images so as to be overlapped with one another.

Similar to the third embodiment, when the peel-off member of this printing material is removed, and the adhesive face of the sealing member, for example, is attached to a window from the indoor side, characters of "ABC" can be seen from the outdoor side through the sealing member (the characters "ABC" can be seen from a side opposite to the printing face of the sealing member). When the printing material is used as described above, the sealing member is configured to be a transparent or semi-transparent member, and the image of the first layer is a mirrored image.

According to the fourth embodiment, a plurality of white images is formed to be overlapped. Thus, compared to the third embodiment, the layer of the white image becomes thick. Accordingly, in the fourth embodiment, a background image can be printed to be thicker than that in the third embodiment. As a result, the characters "ABC" can be seen easily.

Printing Method According to Fourth Embodiment

Figure 14B:
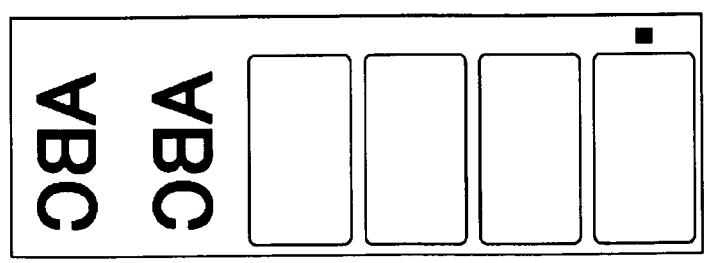
FIG. 14B is an explanatory diagram of image data that is used for a printing operation according to the fourth embodiment.

FIG. 14B is an explanatory diagram of image data that is used for the printing operation according to the fourth embodiment. As shown in the figure, the image data includes two mirrored images ABC to be printed in the areas A and B and four white images to be printed in the areas C to F. In addition, the white images printed in the areas C and D become the white images of the first layer, and the white images of the areas E and F become the white images of the second layer. In addition, the image data also includes a mark to be printed in the area F.

Figure 15:
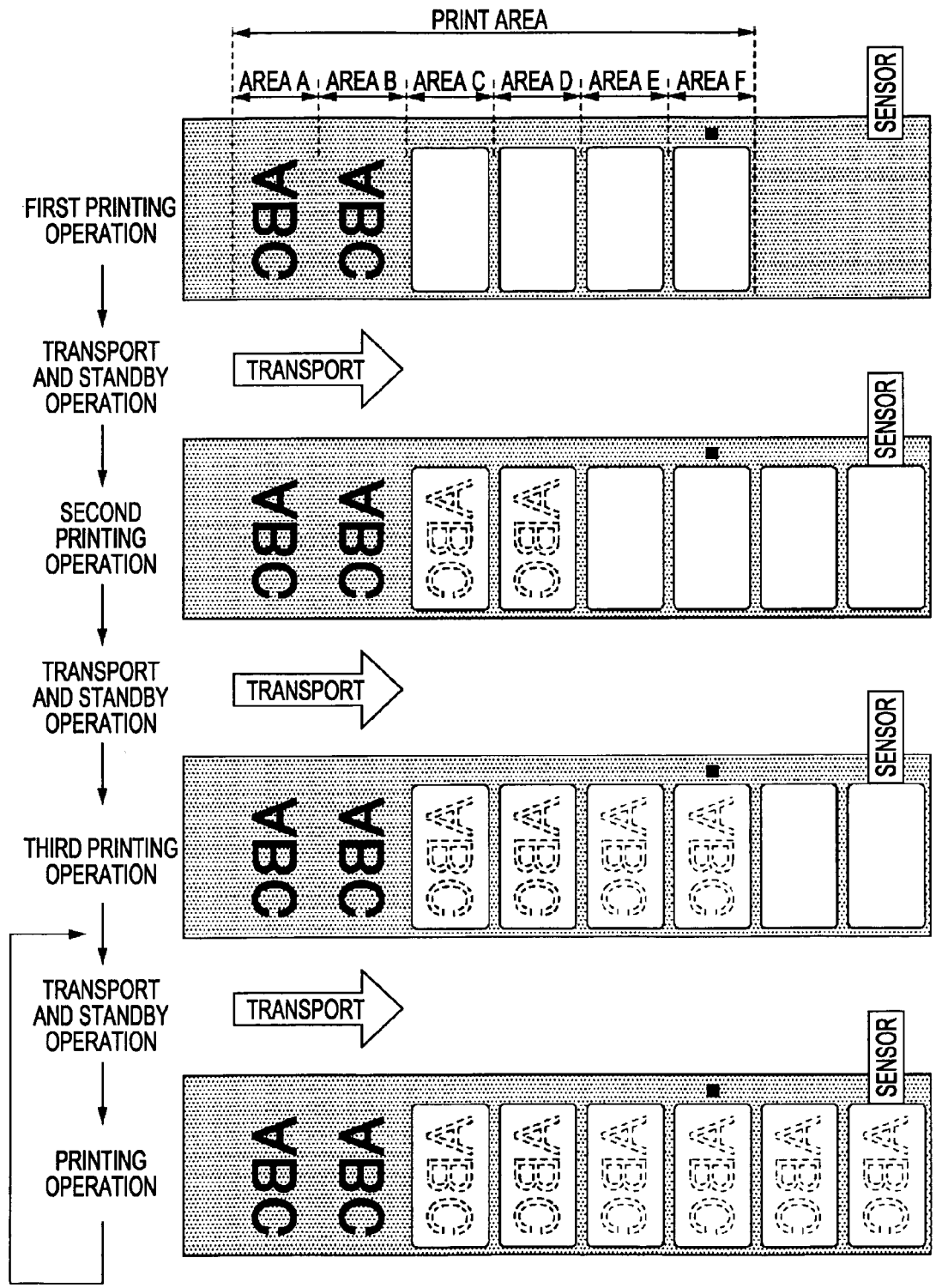
FIG. 15 is an explanatory diagram of a printing method according to the fourth embodiment.

FIG. 15 is an explanatory diagram of a printing method according to a fourth embodiment of the invention. As described below, according to the fourth embodiment, a printer repeats a printing operation that is performed based on the image data shown in FIG. 14B and a transport operation of a transport amount corresponding to a length of two printing materials.

First, in a first printing operation, the printer 1 prints the mirrored images ABC in areas A and B while moving the head 31 in the moving direction. In addition, the printer 1 prints white images in areas C to F that are located on the downstream side of the areas A and B in the transport direction in addition, in the first printing operation, a mark is printed in the area F.

After the first printing operation is performed, the printer 1 transports the medium by a transport amount corresponding to a length of two printing materials (transport operation). When the medium is transported until the mark that is printed in the area F in the above-described first printing operation is detected by a sensor, a transport operation of a transport amount corresponding to the length of two printing materials is completed. This transport operation is performed as a standby operation for drying the white images or the mirrored images ABC, as well. By performing this transport operation, a medium on which any image has not been printed is transported to the areas A and B, the mirrored images ABC that have been printed in the areas A and B in the first printing operation are transported to the areas C and D, and the white images printed in the areas C and D are transported to the areas E and F.

In the second printing operation, the printer 1, same as in the first printing operation, prints the mirrored images ABC in the areas A and B and prints the white images in the areas C to F. However, in the second printing operation, there are the mirrored images ABC in the areas C and D, and there are the white images that are printed in the first printing operation in the areas E and F. Accordingly, by performing the second printing operation, the white images are printed on the mirrored images ABC in the areas C and D, and the white images of the second layer are printed in the areas E and F.

After the second printing operation is performed, the printer 1 transports the medium by a transport amount corresponding to a length of two printing materials (the transport operation). By performing this transport operation, a medium on which any image has not been printed is transported to the areas A and B. In addition, the mirrored images ABC printed in the areas A and B in the second printing operation are transported to the areas C and D, and the white images printed on the mirrored images ABC in the areas C and D in the second printing operation are transported to the areas E and F.

In the third printing operation, the printer 1, same as in the first or second printing operation, prints the mirrored images ABC in the areas A and B and prints the white images in the areas C to F. However, in the third printing operation, there are the mirrored images ABC in the areas C to D, and there are the white images printed on the mirrored images ABC in the areas E and F. Accordingly, by performing the third printing operation, the white images are printed on the mirrored images ABC in the areas C and D, and two printing materials are completed in the areas E and F.

After performing the third printing operation, by alternately repeating the same transport operation and the same printing operation, the printing materials are printed on the medium with spaced equally. In addition, by performing the third and subsequent printing operations, the mirrored images ABC are printed in the areas A and B, the white images are printed on the mirrored images ABC in the areas C and D, and two printing materials are completed in the areas E and F. In addition, by performing the third and subsequent transport operations, a medium on which any image is not printed is transported to the areas A and B, the mirrored images ABC printed in the areas A and B in the previous printing operation are transported to areas C and D, and the white images that are printed on the mirrored images ABC in the areas C and D in the previous printing operation are transported to the areas E and F.

According to the fourth embodiment, two printing materials are completed for each printing operation.

According to the fourth embodiment, a different printing material can be printed while the same advantages as those of the third embodiment are acquired.

Fifth Embodiment

Printing Material of Fifth Embodiment

Figure 16A:
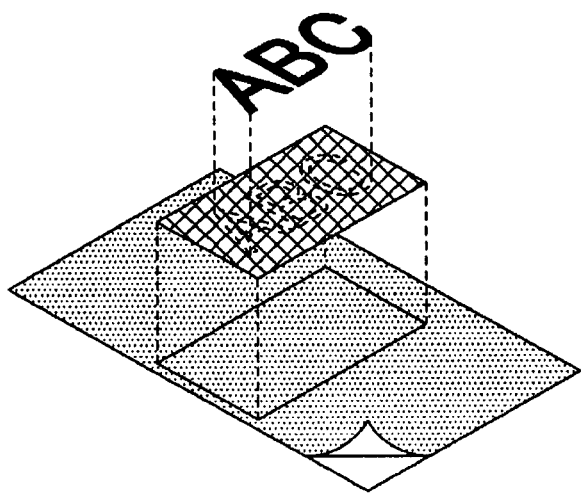
FIG. 16A is an explanatory diagram of a printing material according to a fifth embodiment of the invention.

FIG. 16A is an explanatory diagram of a printing material according to a fifth embodiment of the invention. Compared to the printing material according to the first embodiment, an image under the image ABC is not a white image but a different image.

A medium is configured by a sealing member having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member or an opaque member. In addition, the medium may not be a sealing sheet and may be a transparent film that does not have any adhesive face or a paper sheet.

This printing material is acquired by printing two images so as to be overlapped with each other on the medium. An image that is printed first on the medium is a rectangular image (hereinafter, referred to as a "base image" formed by coating a fixing agent. In addition, an image that is printed on the base image is an image ABC. In other words, this printing material is acquired from forming a first layer of the base image and a second layer of the image ABC so as to be overlapped with each other on a medium.

The fixing agent has a function for promoting absorption of ink. By printing the base image on the medium by using the fixing agent, an image (here, the image ABC) can be easily printed on the medium that cannot easily absorb ink. In addition, a fixing agent that has other functions may be used.

Printing Method According to Fifth Embodiment

Figure 16B:
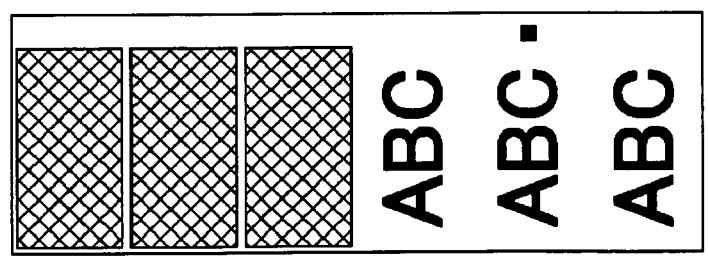
FIG. 16B is an explanatory diagram of image data that is used for a printing operation according to the fifth embodiment.

FIG. 16B is an explanatory diagram of image data that is used for a printing operation according to the fifth embodiment. As shown in the figure, the image data includes three base images to be printed in the areas A to C and three images ABC to be printed in the areas D to F. In addition, the image data also includes a mark to be printed in the area E.

Figure 17:
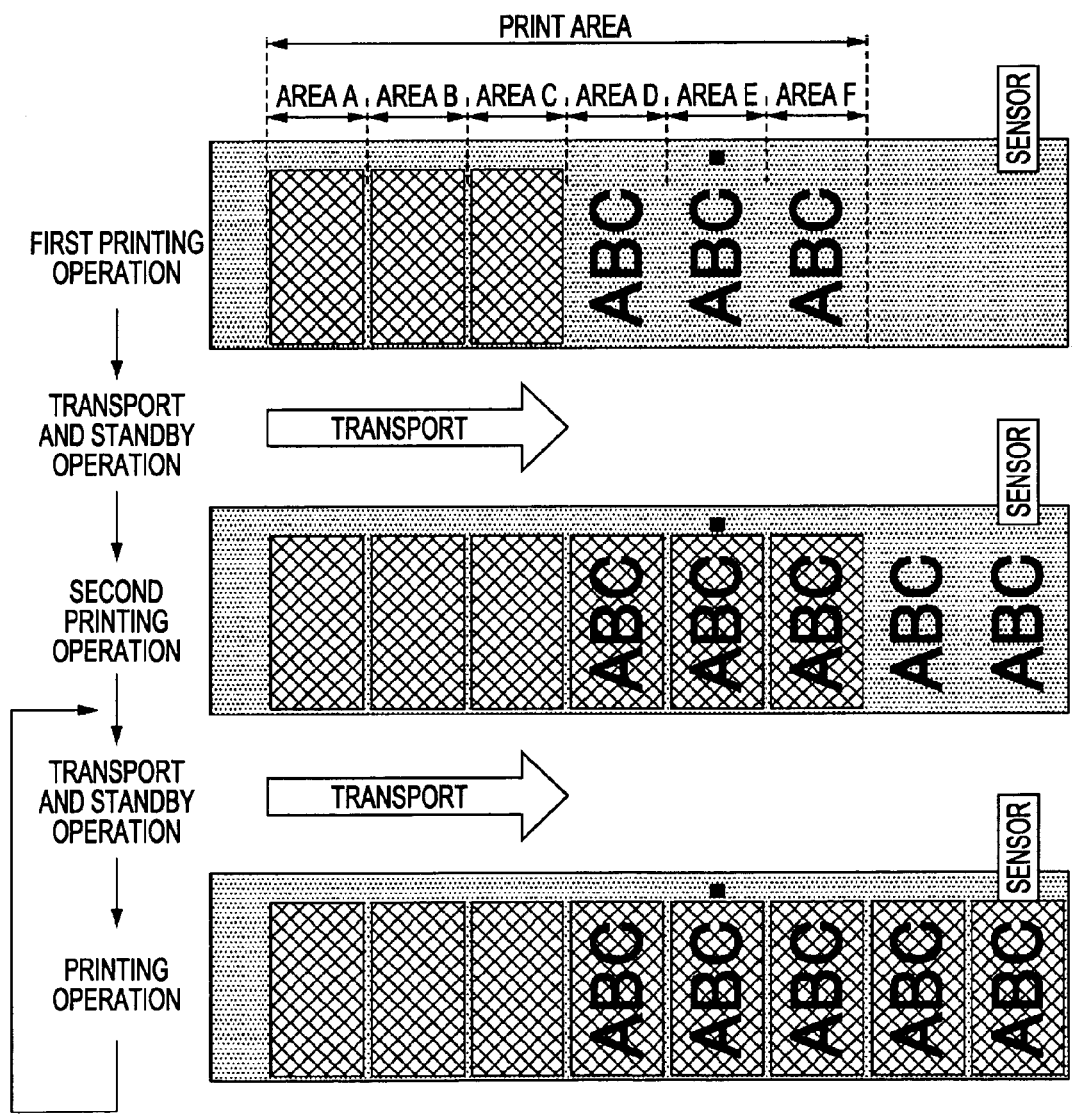
FIG. 17 is an explanatory diagram of a printing method according to a fifth embodiment of the invention.

FIG. 17 is an explanatory diagram of a printing method according to a fifth embodiment of the invention. As described below, according to the fifth embodiment, a printer repeats a printing operation (for printing the base images in the areas A to C and printing the images ABC in the areas D to F) that is performed based on the image data shown in FIG.

16B and a transport operation of a transport amount corresponding to a length of three printing materials.

By referring to FIG. 17, the printing method according to the fifth embodiment can be clearly understood, and thus, a description thereof is omitted here. According to the fifth embodiment, three printing materials are completed for each printing operation. In addition, according to the fifth embodiment, a different printing material can be printed while the same advantages as those of the first embodiment are acquired.

Sixth Embodiment

Printing Material of Sixth Embodiment

Figure 18A:
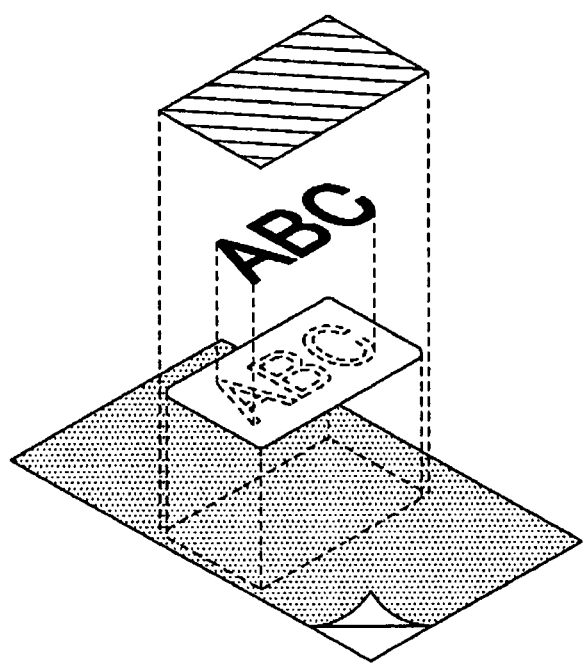
FIG. 18A is an explanatory diagram of a printing material according to a sixth embodiment of the invention.

FIG. 18A is an explanatory diagram of a printing material according to a sixth embodiment of the invention. Compared to the printing material according to the first embodiment, the number of images (the number of layers) printed on the medium is different in the first embodiment.

A medium is configured by a sealing member having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member or an opaque member. In addition, the medium may not be a sealing sheet and may be a transparent film that does not have any adhesive face or a paper sheet.

This printing material is acquired by printing three images so as to be overlapped with one another on the medium. An image that is printed first on the medium is a white image. An Image that is printed on the white image is an image ABC. In addition, an image that is printed on the image ABC is a rectangular image (hereinafter, referred to as a "coating image") that is formed by coating a coating agent. In other words, this printing material is acquired from forming a first layer of the white image, a second layer of the image ABC, and a third layer of the coating image so as to be overlapped with one another.

The coating agent has a function for improving luster, a function for improving water resistance, and the like. In other words, by forming the coating agent as the third layer, the luster of the white image and the image ABC can be improved, and the water resistance of the printing material can be improved. In addition, a coating agent having other functions may be used.

Printing Method According to Sixth Embodiment

Figure 18B:
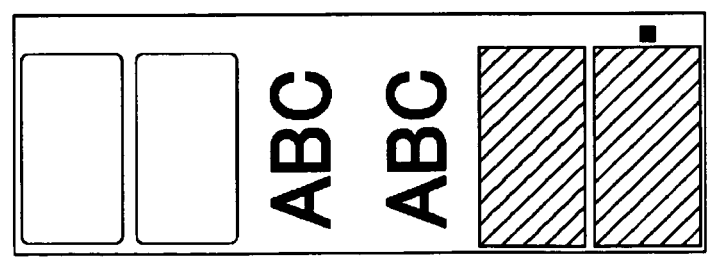
FIG. 18B is an explanatory diagram of image data that is used for a printing operation according to the sixth embodiment.

FIG. 18B is an explanatory diagram of image data that is used for a printing operation according to the sixth embodiment. As shown in the figure, the image data includes two white images to be printed in the areas A and B, two images ABC to be printed in the areas C and D, and two coating images to be printed in the areas E and F. In addition, the image data also includes a mark to be printed in the area F.

Figure 19:
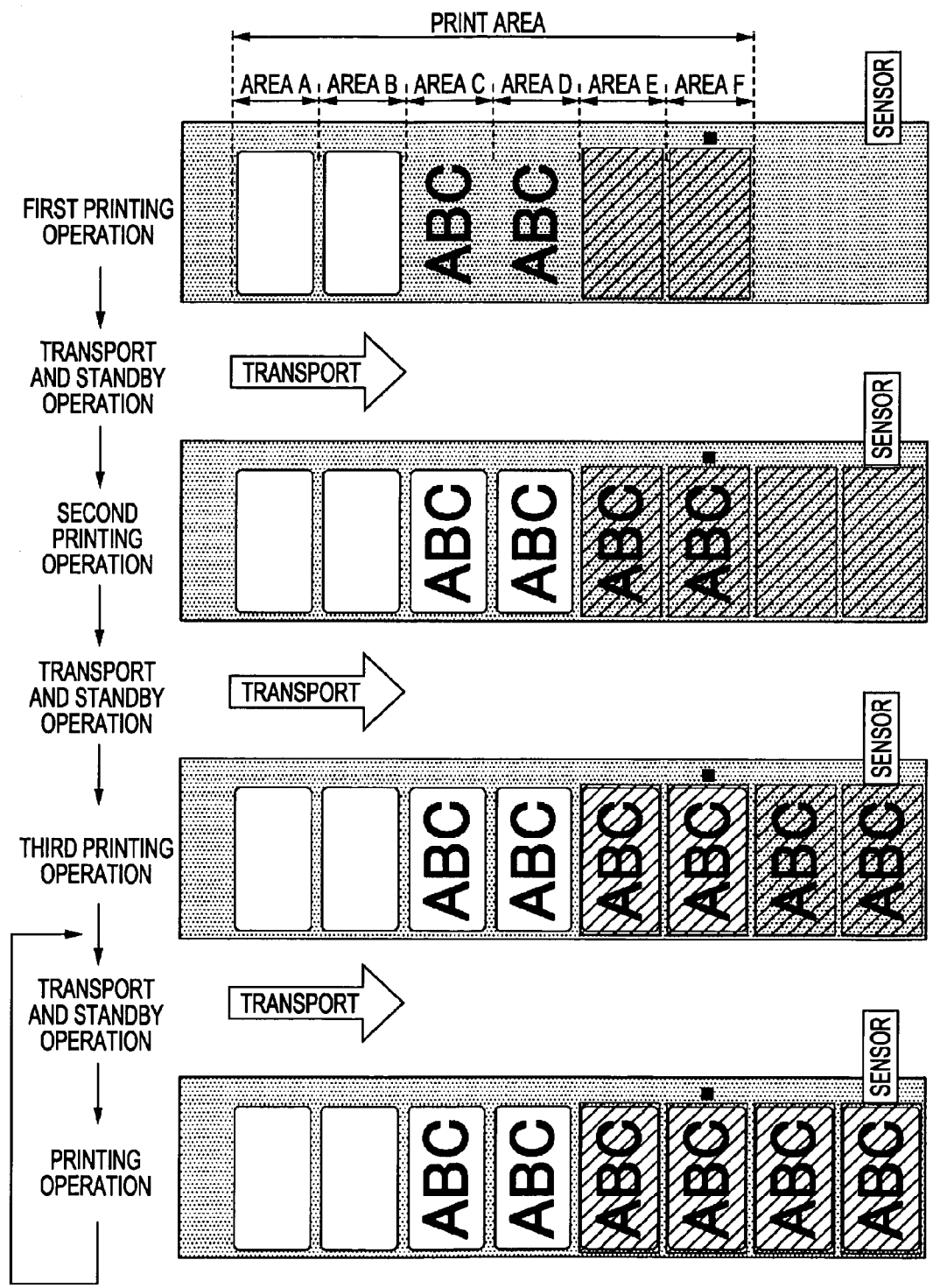
FIG. 19 is an explanatory diagram of a printing method according to a sixth embodiment of the invention.

FIG. 19 is an explanatory diagram of a printing method according to a sixth embodiment of the invention. As described below, according to the sixth embodiment, a printer repeats a printing operation that is performed based on the image data shown in FIG. 18B and a transport operation of a transport amount corresponding to a length of two printing materials.

First, in a first printing operation, the printer 1 prints the white images in areas A and B while moving the head 31 in the moving direction. In addition, the printer 1 prints the images ABC in areas C and D that are located on the downstream side of the areas A and B in the transport direction and prints the coating images in areas E and F that are located on the downstream side of the areas C and D in the transport direction. In addition, in the first printing operation, a mark is printed in the area F.

After the first printing operation is performed, the printer 1 transports the medium by a transport amount corresponding to a length of two printing materials (transport operation). When the medium is transported until the mark that is printed in the area F in the above-described first printing operation is detected by a sensor, a transport operation of a transport amount corresponding to the length of two printing materials is completed. This transport operation is performed as a standby operation for drying the white images or the images ABC, as well. By performing this transport operation, a medium on which any image has not been printed is transported to the areas A and B, the white images that have been printed in the areas A and B in the first printing operation are transported to the areas C and D, and the images ABC printed in the areas C and D in the first printing operation are transported to the areas E and F.

In the second printing operation, the printer 1, same as in the first printing operation, prints the white images in the areas A and B, prints the images ABC in the areas C and D, and prints the coating images in the areas E and F. However, in the second printing operation, there are the white images in the areas C and D that are printed in the first printing operation, and there are the images ABC that are printed in the first printing operation in the areas E and F. Accordingly, by performing the second printing operation, the images ABC are printed on the white images in the areas C and D, and the coating images are printed on the images ABC in the areas E and F.

After the second printing operation is performed, the printer 1 transports the medium by a transport amount corresponding to a length of two printing materials (the transport operation). By performing this transport operation, a medium on which any image has not been printed is transported to the areas A and B. In addition, the white images printed in the areas A and B in the second printing operation are transported to the areas C and D, and the images ABC printed on the white images in the areas C and D in the second printing operation are transported to the areas E and F.

In the third printing operation, the printer 1, same as in the first or second printing operation, prints the white images in the areas A and B, prints the images ABC in the areas C and D, and prints the coating images in the areas E and F. However, in the third printing operation, there are the white images in the areas C to D, and there are the images ABC printed on the white images in the areas E and F. Accordingly, by performing the third printing operation, the images ABC are printed on the white images in the areas C and D, and two printing materials are completed in the areas E and F.

After performing the third printing operation, by alternately repeating the same transport operation and the same printing operation, the printing materials are printed on the medium with spaced equally. In addition, by performing the third and subsequent printing operations, the white images are printed in the areas A and B, the images ABC are printed on the white images in the areas C and D, and two printing materials are completed in the areas E and F. In addition, by performing the third and subsequent transport operations, a medium on which any image is not printed is transported to the areas A and B, the white images printed in the areas A and B in the previous printing operation are transported to areas C and D, and the images ABC that are printed on the white images in the areas C and D in the previous printing operation are transported to the areas E and F.

According to the sixth embodiment, two printing materials are completed for each printing operation.

According to the sixth embodiment, a different printing material can be printed while the same advantages as those of the first embodiment are acquired.

First Modified Example

Figure 20:
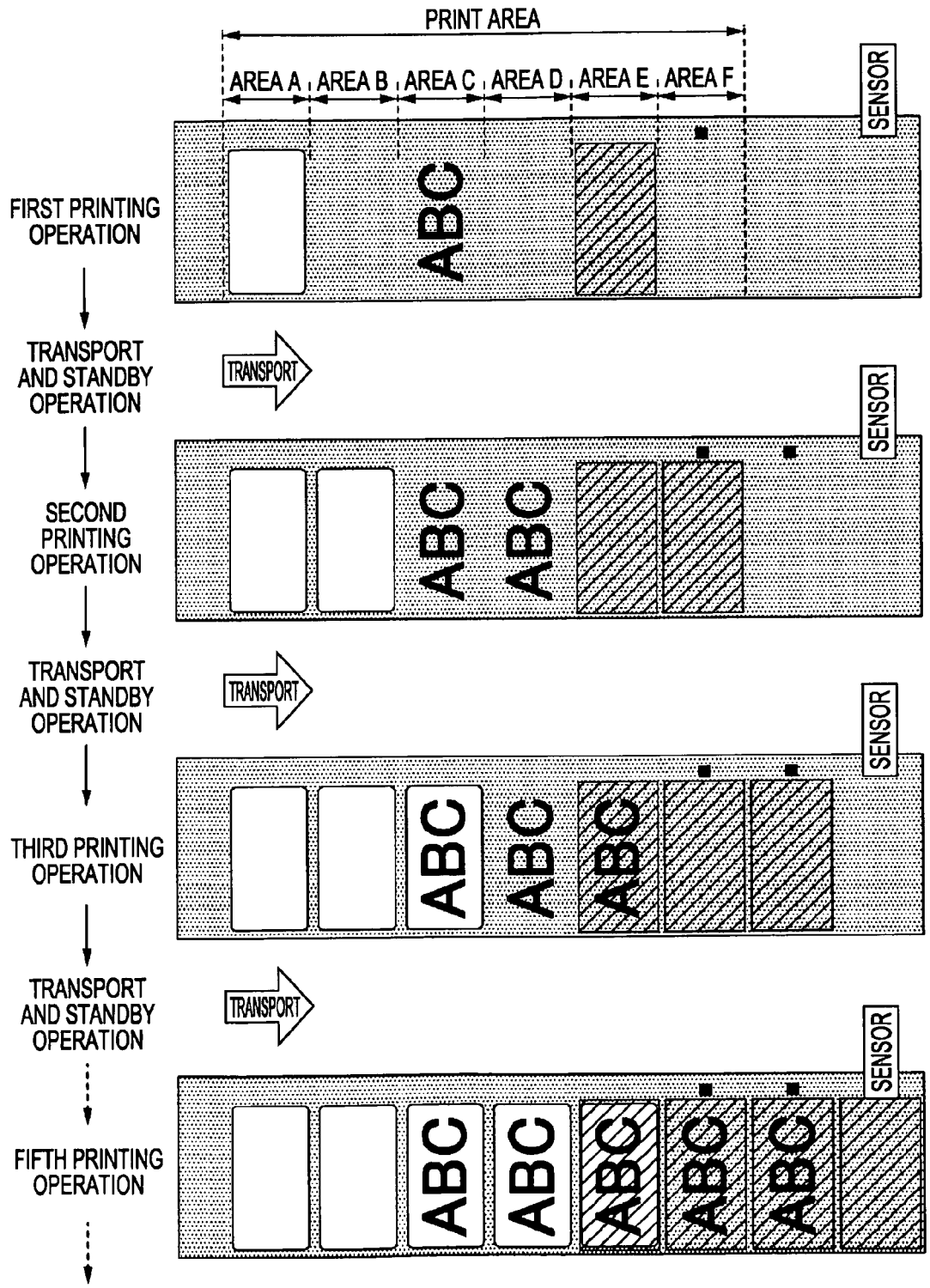
FIG. 20 is an explanatory diagram of a first modified example of the sixth embodiment.

FIG. 20 is an explanatory diagram of a first modified example of the sixth embodiment. As described below, according to this modified example, the printer repeats a printing operation for printing the white image in the area A, printing the image ABC in the area C, and printing the coating image in the area E and a transport operation of a transport amount corresponding to a length of one printing material.

First, in a first printing operation, the printer 1 prints the white image in an area A while moving the head 31 in the moving direction. In addition, the printer 1 prints the image ABC in an area C that is located on the downstream side of the area A in the transport direction and prints the coating images in an area E that are located on the downstream side of the area C in the transport direction. At this moment, any image is not printed in the areas B, D, and F. In addition, in the first printing operation, a mark is printed in an area F.

After the first printing operation is performed, the printer 1 transports the medium by a transport amount corresponding to a length of one printing material (transport operation). By performing this transport operation, a medium on which any image is not printed is transported to the area A, the white image printed in the area A in the first printing operation is transported to the area B, the image ABC that is printed in the area C in the first printing operation is transported to the area D, and the coating image printed in the area E in the first printing operation is transported to the area F.

In the second printing operation, the printer 1, same as in the first printing operation, prints the white image in the area A, prints the image ABC in the area C, and prints the coating image in the area E. At this moment, any image is not printed in the areas B, D, and F. After performing the second printing operation, the printer 1 alternately repeats the same transport operation and the same printing operation.

In the fifth and subsequent printing operations, the printer 1, same as in the first printing operation, prints the white image in the area A, prints the image ABC in the area C, and prints the coating image in the area E. However, in the fifth and subsequent printing operations, there is the white image in the area C, and there is the image ABC printed on the white image in the area E. Accordingly, by performing the fifth and subsequent printing operations, the image ABC is printed on the white images in the area C, and one printing material is completed in the area E.

In this modified example, one printing material is completed for each printing operation.

In this modified example, as in the above-described first embodiment, an image to be printed in the print area is the same in all the printing operation. Accordingly, in the memory 63 of the printer 1, only one type of the image data is stored.

In this modified example, one printing material is printed for each printing operation. Thus, compared to the sixth embodiment, the printing speed may be slowed down. However, in this modified example, a time until the image ABC is printed after the white image is printed is lengthened. Accordingly, the image ABC can be printed after the white image is sufficiently dried on the hot platen 41. In addition, in this modified example, a time until the coating image is printed after the image ABC is printed is lengthened. Accordingly, the coating image can be printed after the image ABC is sufficiently dried on the hot platen 41.

The transport amount of the transport operation of this modified example is smaller than that of the sixth embodiment. Accordingly, in this modified example, the drying mechanism 42 may be configured to heat the medium in a range corresponding to one area (for example, the area A), and thereby power consumption can be decreased.

Second Modified Example

Figure 21:
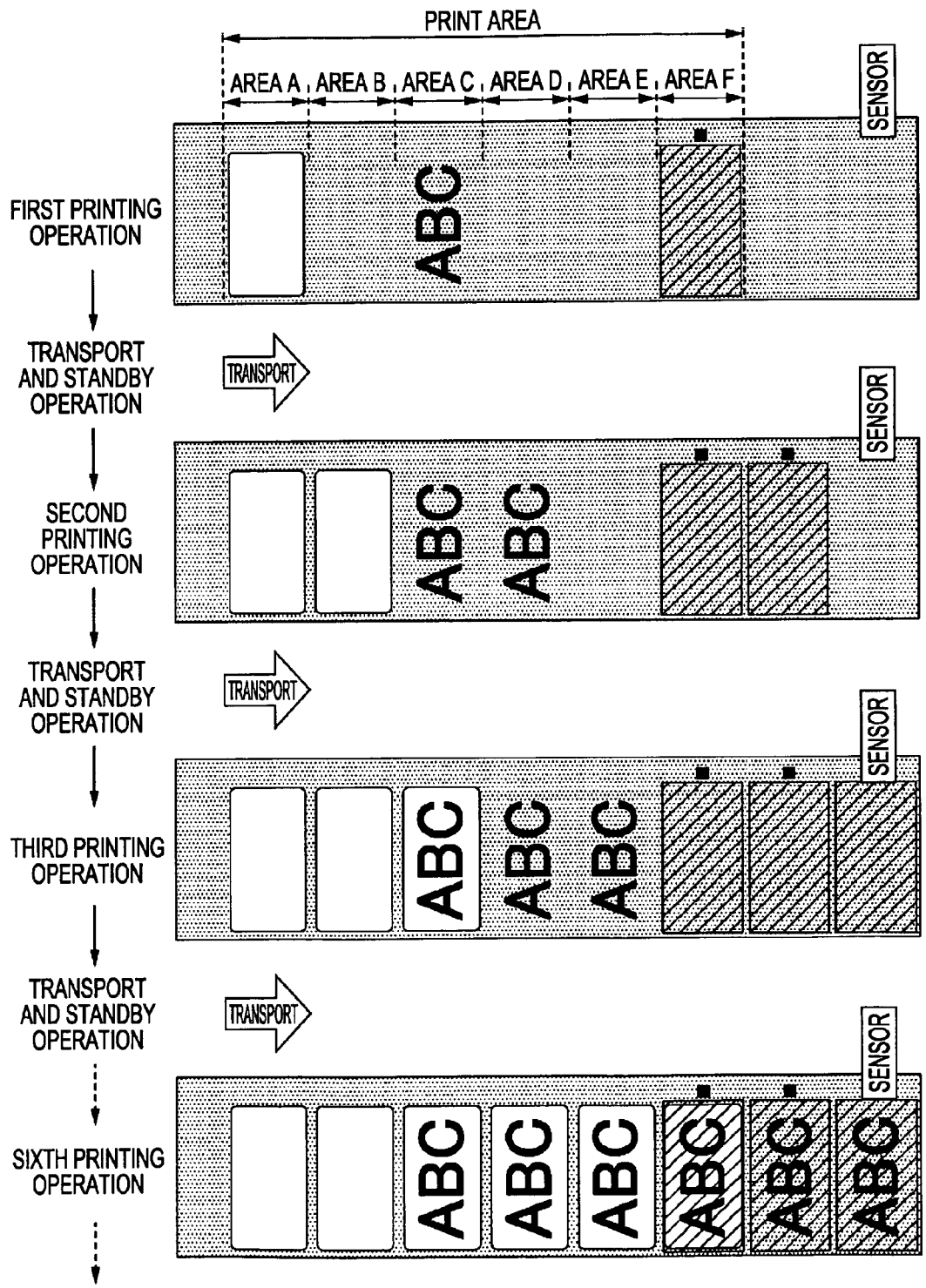
FIG. 21 is an explanatory diagram of a second modified example of the sixth embodiment.

FIG. 21 is an explanatory diagram of a second modified example of the sixth embodiment. According to this second modified example, a place in which the coating image is printed is different from that according to the first modified example.

According to the second modified example, the place in which the coating image is printed is the area F. In other words, the place in which the coating image is printed is located on a relatively downstream side in the transport direction, compared to the first modified example. As a result, according to the second modified example, a time until the coating image is printed after the image ABC is printed is lengthened, compared to the first modified example. Accordingly, the coating image can be printed after the image ABC is sufficiently dried on the hot platen 41.

In particular, the printing material according to the sixth embodiment is printed by overlapping three images, and it is more difficult to dry a second image (here, the image ABC) than a first image (here, the white image). Accordingly, the drying time of the second image needs to be set longer than that of the first image. In such a case, as in the second modified example, image data in which an interval between the second image and the third image is set to be longer than an interval between the first image and the second image is prepared.

On the other hand, when it is more difficult to dry the first image than the second image, image data in which an interval between the first image and the second image is set to be longer than an interval between the second image and the third image is prepared. As described above, by setting the interval between an image requiring a long drying time and an image located on the downstream side thereof to be long, spread can be suppressed.

Seventh Embodiment

Printing Material of Seventh Embodiment

Figure 22A:
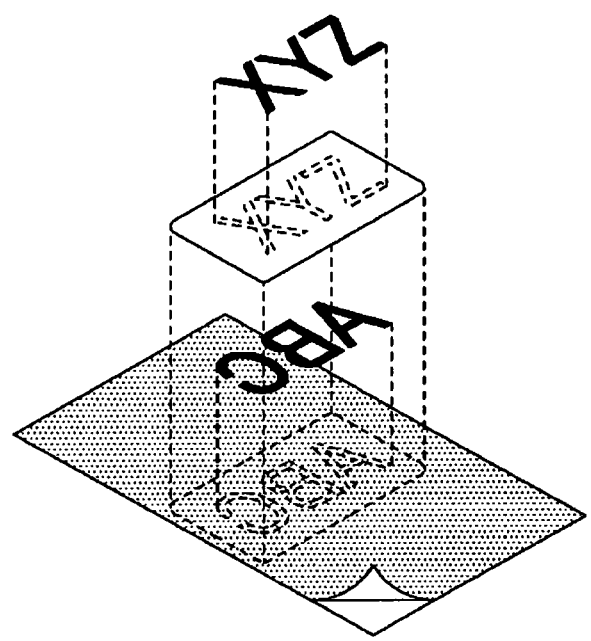
FIG. 22A is an explanatory diagram of a printing material according to a seventh embodiment of the invention.

FIG. 22A is an explanatory diagram of a printing material according to a seventh embodiment of the invention. Similar to the sixth embodiment, according to the seventh embodiment, three images are overlapped. However, according to the seventh embodiment, images to be printed are different from those according to the sixth embodiment.

A medium is configured by a sealing member having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member. In addition, the medium may not be a sealing sheet and may be a transparent film that does not have any adhesive face.

This printing material is acquired by printing three images so as to be overlapped with one another on the medium. An image that is printed first on the medium is a mirrored image ABC. An Image that is printed on the mirrored image ABC is a white image. In addition, an image that is printed on the white image is a character image of "XYZ" (hereinafter, referred to as an "image XYZ"). In other words, this printing material is acquired from forming a first layer of the mirrored image ABC, a second layer of the white image, and a third layer of the image XYZ so as to be overlapped with one another.

When the peel-off member of this printing material is removed, and the adhesive face of the sealing member, for example, is attached to a window from the indoor side, characters of "XYZ" can be seen from the indoor side, and characters of "ABC" can be seen from the outdoor side through the sealing member (the characters "ABC" can be seen from a side of the sealing member that is located opposite to the printing face). In other words, the images of this printing material can be seen from both sides. When the printing material is used as described above, the sealing member is configured to be a transparent or semi-transparent member, and the image of the first layer is a mirrored image.

The white image is formed between the mirrored image ABC and the image XYZ. Accordingly, when the characters "ABC" is seen from the outdoor side, the image XYZ can not be seen. On the contrary, when the characters "XYZ" are seen from the indoor side, the mirrored image ABC cannot be seen.

Printing Method According to Seventh Embodiment

Figure 22B:
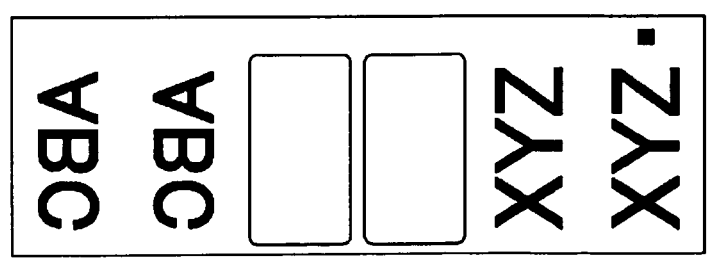
FIG. 22B is an explanatory diagram of image data that is used for a printing operation according to the seventh embodiment.

FIG. 22B is an explanatory diagram of image data that is used for a printing operation according to the seventh embodiment. As shown in the figure, the image data includes two mirrored images ABC to be printed in the areas A and B, two white images to be printed in the areas C and D, and two images XYZ to be printed in the areas E and F. In addition, the image data also includes a mark to be printed in the area F.

Figure 23:
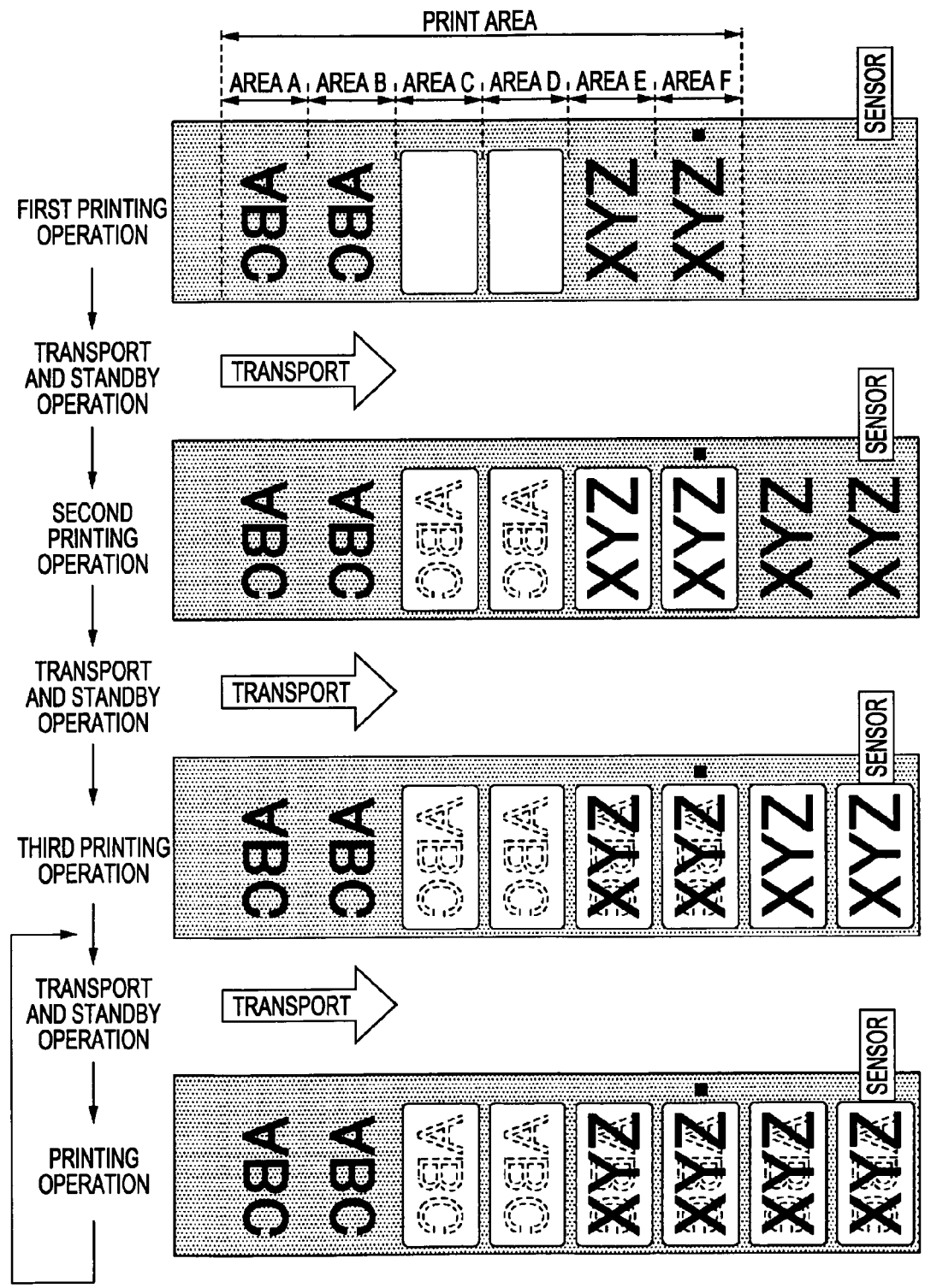
FIG. 23 is an explanatory diagram of a printing method according to a seventh embodiment of the invention.

FIG. 23 is an explanatory diagram of a printing method according to a seventh embodiment of the invention. As described below, according to the seventh embodiment, a printer repeats a printing operation that is performed based on the image data shown in FIG. 22B and a transport operation of a transport amount corresponding to a length of two printing materials.

First, in a first printing operation, the printer 1 prints the mirrored images ABC in the areas A and B while moving the head 31 in the moving direction. In addition, the printer 1 prints the white images in the areas C and D that are located on the downstream side of the areas A and B in the transport direction and prints the images XYZ in the areas E and F that are located on the downstream side of the areas C and D in the transport direction. In addition, in the first printing operation, a mark is printed in the area F.

After the first printing operation is performed, the printer 1 transports the medium by a transport amount corresponding to a length of two printing materials (transport operation). When the medium is transported until the mark that is printed in the area F in the above-described first printing operation is detected by a sensor, a transport operation of a transport amount corresponding to the length of two printing materials is completed. This transport operation is performed as a standby operation for drying the mirrored images ABC or the white images, as well. By performing this transport operation, a medium on which any image has not been printed is transported to the areas A and B, the mirrored images ABC that have been printed in the areas A and B in the first printing operation are transported to the areas C and D, and the white images printed in the areas C and D in the first printing operation are transported to the areas E and F.

In the second printing operation, the printer 1, same as in the first printing operation, prints the mirrored images ABC in the areas A and B, prints the white images in the areas C and D, and prints the images XYZ in the areas E and F. However, in the second printing operation, there are the mirrored images ABC in the areas C and D that are printed in the first printing operation, and there are the white images in the areas E and F that are printed in the first printing operation. Accordingly, by performing the second printing operation, the white images are printed on the mirrored images ABC in the areas C and D, and the images XYZ are printed on the white images in the areas E and F.

After the second printing operation is performed, the printer 1 transports the medium by a transport amount corresponding to a length of two printing materials (the transport operation). By performing this transport operation, a medium on which any image has not been printed is transported to the areas A and B. In addition, the mirrored images ABC printed in the areas A and B in the second printing operation are transported to the areas C and D, and the white images printed on the mirrored images ABC in the areas C and D in the second printing operation are transported to the areas E and F.

In the third printing operation, the printer 1, same as in the first or second printing operation, prints the mirrored images ABC in the areas A and B, prints the white images in the areas C and D, and prints the images XYZ in the areas E and F. However, in the third printing operation, there are the mirrored images ABC in the areas C to D, and there are the white images printed on the mirrored images ABC in the areas E and F. Accordingly, by performing the third printing operation, the white images are printed on the mirrored images ABC in the areas C and D, and two printing materials are completed in the areas E and F.

After performing the third printing operation, by alternately repeating the same transport operation and the same printing operation, the printing materials are printed on the medium with spaced equally. In addition, by performing the third and subsequent printing operations, the mirrored images ABC are printed in the areas A and B, the white images are printed on the mirrored images ABC in the areas C and D, and two printing materials are completed in the areas E and F. In addition, by performing the third and subsequent transport operations, a medium on which any image is not printed is transported to the areas A and B, the mirrored images ABC printed in the areas A and B in the previous printing operation are transported to areas C and D, and the white images that are printed on the mirrored images ABC in the areas C and D in the previous printing operation are transported to the areas E and F.

According to the seventh embodiment, two printing materials are completed for each printing operation.

According to the seventh embodiment, a different printing material can be printed while the same advantages as those of the first embodiment are acquired.

First Modified Example

Figure 24:
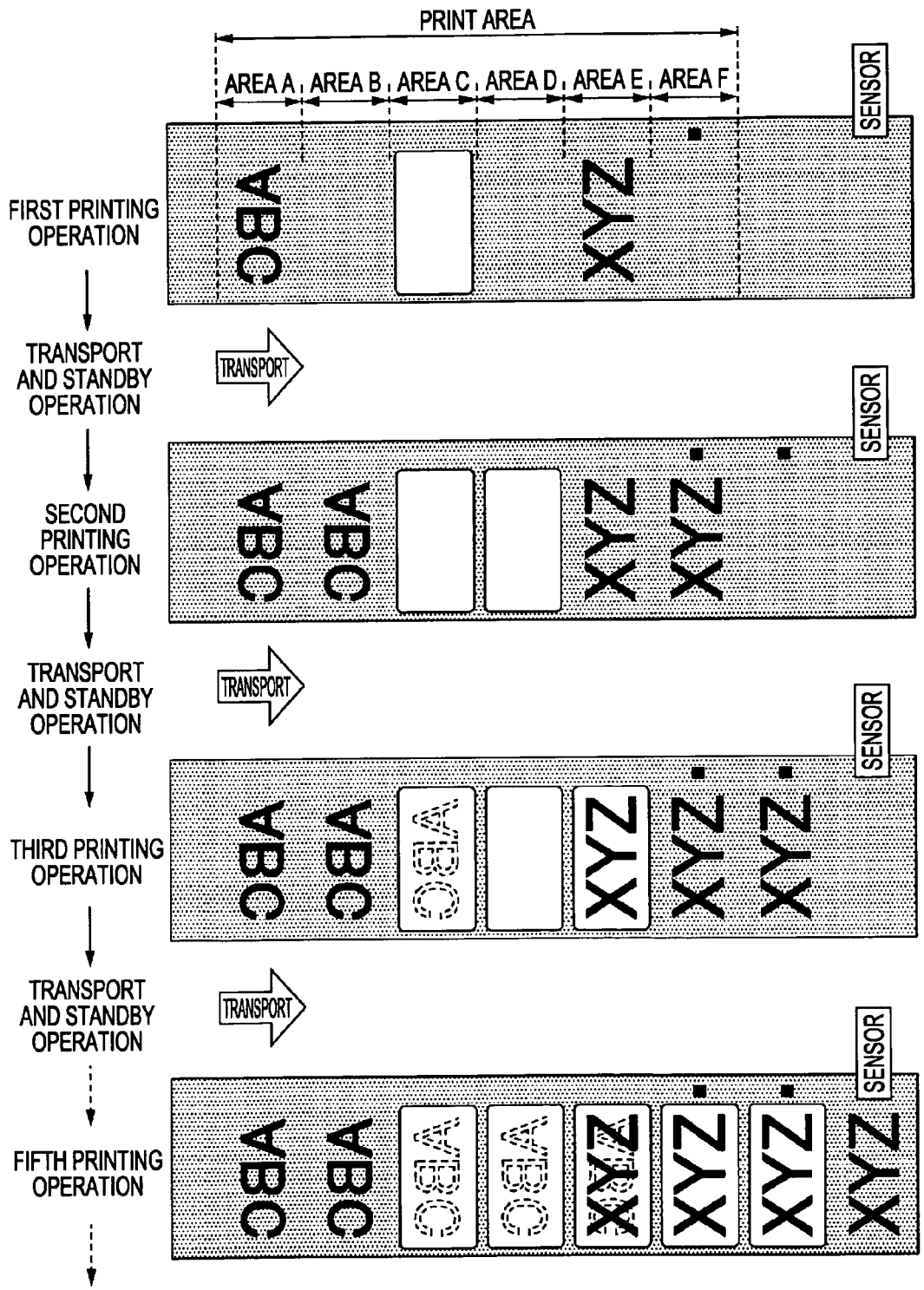
FIG. 24 is an explanatory diagram of a first modified example of the seventh embodiment.

FIG. 24 is an explanatory diagram of a first modified example of the seventh embodiment. As described below, according to this modified example, the printer repeats a printing operation for printing the mirrored image ABC in the area A, printing the white image in the area C, and printing the image XYZ in the area E and a transport operation of a transport amount corresponding to a length of one printing material.

First, in a first printing operation, the printer 1 prints the mirrored image ABC in area A while moving the head 31 in the moving direction. In addition, the printer 1 prints the white image in the area C that is located on the downstream side of the area A in the transport direction and prints the image XYZ in the area E that is located on the downstream side of the area C in the transport direction. At this moment, any image is not printed in the areas B, D, and F. In addition, in the first printing operation, a mark is printed in the area F.

After the first printing operation is performed, the printer 1 transports the medium by a transport amount corresponding to a length of one printing material (transport operation). By performing this transport operation, a medium on which any image has not been printed is transported to the area A, the mirrored image ABC that has been printed in the area A in the first printing operation is transported to the area B, and the white image printed in the area C in the first printing operation is transported to the area D, and the image XYZ printed in the area E in the first printing operation is transported to the area F.

In the second printing operation, the printer 1, same as in the first printing operation, prints the mirrored image ABC in the area A, prints the white image in the area C, and prints the image XYZ in the area E. At this moment, any image is not printed in the areas B, D, and F. After performing the second printing operation, the printer 1 alternately repeats the same transport operation and the same printing operation.

In the fifth and subsequent printing operations, the printer 1, same as in the first printing operation, prints the mirrored image ABC in the area A, prints the white image in the area C, and prints the image XYZ in the area E. However, in the fifth and subsequent printing operations, there is the mirrored image ABC in the area C, and there is the white image printed on the mirrored image ABC in the area E. Accordingly, by performing the fifth and subsequent printing operations, the white image is printed on the mirrored image ABC in the area C, and one printing material is completed in the area E.

In this modified example, one printing material is completed for each printing operation.

In this modified example, as in the above-described first embodiment, an image to be printed in the print area is the same in all the printing operation. Accordingly, in the memory 63 of the printer 1, only one type of the image data is stored.

In this modified example, one printing material is printed for each printing operation. Thus, compared to the seventh embodiment, the printing speed may be slowed down. However, in this modified example, a time until the white image is printed after the mirrored image ABC is printed is lengthened. Accordingly, the white image can be printed after the mirrored image ABC is sufficiently dried on the hot platen 41. In addition, according to this modified example, a time until the image XYZ is printed after the white image is printed is lengthened, and accordingly, the image XYZ can be printed after the white image is sufficiently dried on the hot platen 41.

The transport amount of the transport operation of this modified example is smaller than that of the seventh embodiment. Accordingly, in this modified example, the drying mechanism 42 may be configured to heat the medium in a range corresponding to one area (for example, the area A), and thereby power consumption can be decreased.

Second Modified Example

Figure 25:
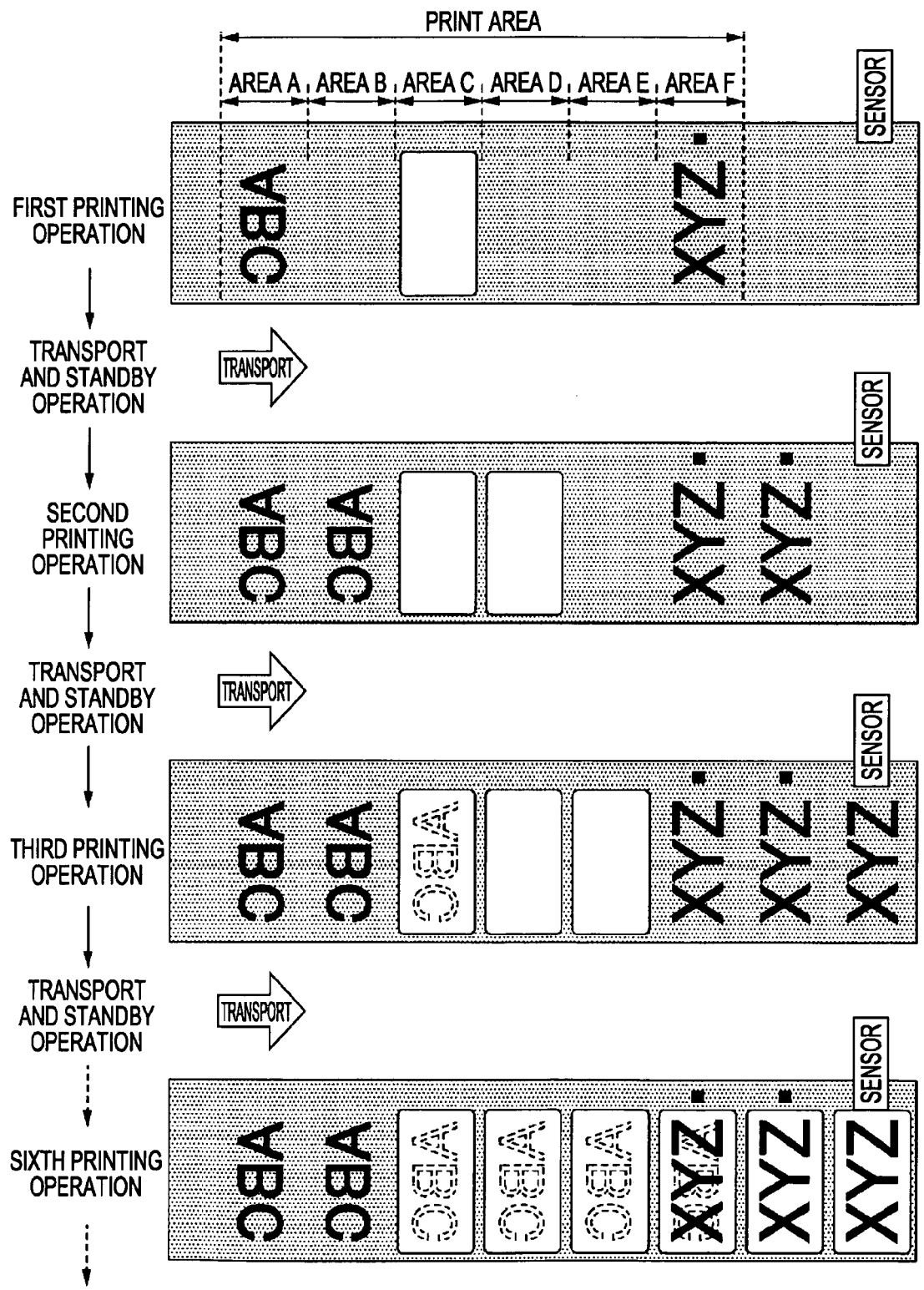
FIG. 25 is an explanatory diagram of a second modified example of the seventh embodiment.

FIG. 25 is an explanatory diagram of a second modified example of the seventh embodiment. According to this second modified example, a place in which the image XYZ is printed is different from that according to the first modified example.

According to the second modified example, the place in which the image XYZ is printed is the area F. In other words, the place in which the image XYZ is printed is located on a relatively downstream side in the transport direction, compared to the first modified example. As a result, according to the second modified example, a time until the image XYZ is printed after the white image is printed is lengthened, compared to the first modified example. Accordingly, the image XYZ can be printed after the white image is sufficiently dried on the hot platen 41.

In particular, the printing material according to the seventh embodiment is printed by overlapping three images, and it is more difficult to dry a second image (here, the white image) than a first image (here, the mirrored image ABC). Accordingly, the drying time of the second image needs to be set longer than that of the first image. In such a case, as in the second modified example, image data in which an interval between the second image and the third image is set to be longer than an interval between the first image and the second image is prepared.

On the other hand, when it is more difficult to dry the first image than the second image, image data in which an interval between the first image and the second image is set to be longer than an interval between the second image and the third image is prepared. As described above, by setting the interval between an image requiring a long drying time and an image located on the downstream side thereof to be long, spread can be suppressed.

Eighth Embodiment

Printing Material of Eighth Embodiment

Figure 26A:
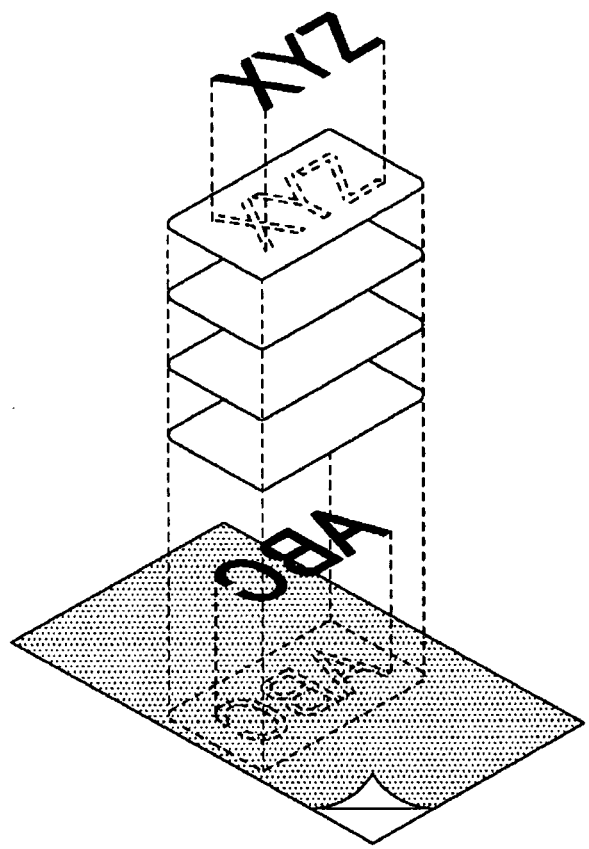
FIG. 26A is an explanatory diagram of a printing material according to an eighth embodiment of the invention.

FIG. 26A is an explanatory diagram of a printing material according to an eighth embodiment of the invention. The number of the white images according to the eighth embodiment is different from that according to the seventh embodiment.

A medium is configured by a sealing member having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member. In addition, the medium may not be a sealing sheet and may be a transparent film that does not have any adhesive face.

This printing material is acquired by printing six images so as to be overlapped with one another on the medium. An image that is printed first on the medium is a mirrored image ABC. On the mirrored image ABC, four white images are printed. In addition, an image that is printed on the white images is the image XYZ. In other words, this printing material is acquired from forming a first layer of the mirrored image ABC, second to fifth layers of the white images, and a sixth layer of the image XYZ so as to be overlapped with one another.

When the peel-off member of this printing material is removed, and the adhesive face of the sealing member, for example, is attached to a window from the indoor side, characters of "XYZ" can be seen from the indoor side, and characters of "ABC" can be seen from the outdoor side through the sealing member (the characters "ABC" can be seen from a side of the sealing member that is located opposite to the printing face). In other words, the images of this printing material can be seen from both sides. When the printing material is used as described above, the sealing member is configured to be a transparent or semi-transparent member, and the image of the first layer is a mirrored image.

According to the eighth embodiment, a plurality of the white images is formed so as to be overlapped with one another, and thereby the thickness of the layers of the white images is larger than that of the seventh embodiment. Therefore, according to the eighth embodiment, compared to the seventh embodiment, it is difficult for the image XYZ to be transmitted when the characters "ABC" are seen from the outdoor side. On the contrary, it is difficult for the mirrored image ABC to be transmitted when the characters "XYZ" are seen from the indoor side.

Printing Method According to Eighth Embodiment

Figure 26B:
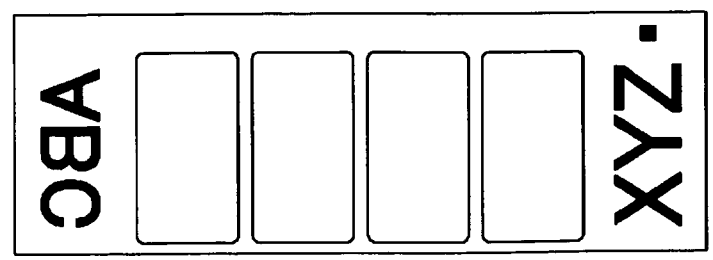
FIG. 26B is an explanatory diagram of image data that is used for a printing operation according to the eighth embodiment.

FIG. 26B is an explanatory diagram of image data that is used for a printing operation according to the eighth embodiment. As shown in the figure, the image data includes a mirrored image ABC to be printed in the area A, four white images to be printed in the areas B to E, and an image XYZ to be printed in the area F. In addition, the white image printed in the area B becomes the white image of the second layer, the white image printed in the area C becomes the white image of the third layer, the white image printed in the area D becomes the white image of the fourth layer, and the white image printed in the area E becomes the white image of the fifth layer. In addition, the image data also includes a mark to be printed in the area F.

Figure 27:
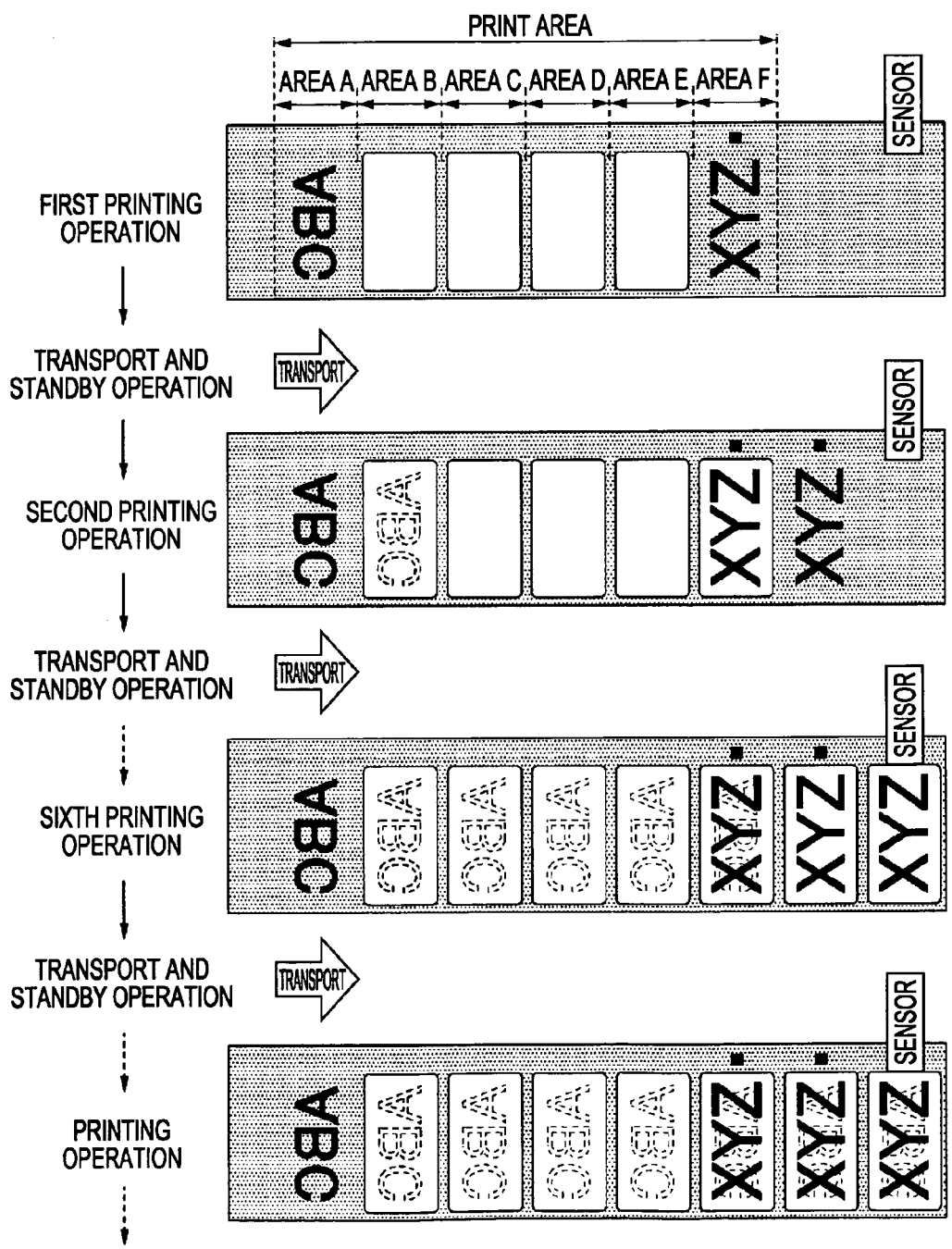
FIG. 27 is an explanatory diagram of a printing method according to an eighth embodiment of the invention.

FIG. 27 is an explanatory diagram of a printing method according to an eighth embodiment of the invention. As described below, according to the eighth embodiment, a printer repeats a printing operation that is performed based on the image data shown in FIG. 26B and a transport operation of a transport amount corresponding to a length of one printing material.

First, in a first printing operation, the printer 1 prints the mirrored image ABC in the area A while moving the head 31 in the moving direction. In addition, the printer 1 prints the white images in the areas B to E that are located on the downstream side of the area A in the transport direction and prints the image XYZ in the area F that is located on the downstream side of the areas B to E in the transport direction. In addition, in the first printing operation, a mark is printed in the area F.

After the first printing operation is performed, the printer 1 transports the medium by a transport amount corresponding to a length of one printing material (transport operation). This transport operation is performed as a standby operation for drying the mirrored images ABC or the white images, as well. By performing this transport operation, a medium on which any image has not been printed is transported to the area A, the mirrored image ABC that has been printed in the area A in the first printing operation is transported to the area B, and the white images printed in the areas B to E in the first printing operation are transported to areas in the vicinity of the downstream side thereof in the transport direction.

In the second printing operation, the printer 1, same as in the first printing operation, prints the mirrored image ABC in the area A, prints the white images in the areas B to E, and prints the image XYZ in the area F. However, in the second printing operation, there is the mirrored image ABC in the area B that is printed in the first printing operation, and there are the white images, which are printed in the first printing operation, in the areas C to F. Accordingly, by performing the second printing operation, the white images are printed on the mirrored image ABC in the area B, the white images are printed on the white images in the areas C to E, and the image XYZ is printed on the white image in the area F. After performing the second printing operation, the printer 1 alternately repeats the same transport operation and the same printing operation.

In the sixth and subsequent printing operations, the printer 1, same as in the first printing operation, prints the mirrored image ABC in the area A, prints the white images in the areas B to E, and prints the image XYZ in the area F. However, in the sixth and subsequent printing operations, there is the mirrored image ABC in the area B, there is the white image of one layer in the area C printed on the mirrored image ABC, there are the white images of two layers printed on the mirrored image ABC in the area D, there are the white images of three layers printed on the mirror image ABC in the area E, and there are the white images of four layers printed on the mirrored image ABC in the area F. Accordingly, by performing the sixth and subsequent printing operations, the white image of the first layer is printed on the mirrored image ABC in the area B, the white image of the second layer is printed on the mirrored image ABC in the area C, the white image of the third layer is printed on the mirrored image ABC in the area D, the white image of the fourth layer is printed on the mirrored image ABC in the area E, and one printing material is completed in the area F.

According to the eighth embodiment, one printing material is completed for each printing operation.

According to the eighth embodiment, a different printing material can be printed while the same advantages as those of the first embodiment are acquired.

Ninth Embodiment

Printing Material of Ninth Embodiment

Figure 28A:
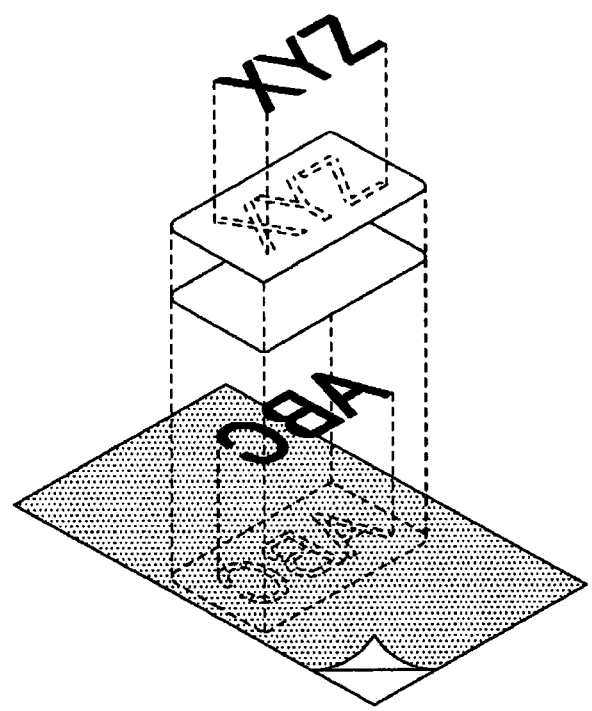
FIG. 28A is an explanatory diagram of a printing material according to a ninth embodiment of the invention.

FIG. 28A is an explanatory diagram of a printing material according to a ninth embodiment of the invention. The number of the white images according to the ninth embodiment is different from that according to the eighth embodiment. In addition, as described below, the configuration of the white images according to the ninth embodiment is different from that according to the eighth embodiment.

A medium is configured by a sealing member having a printing surface as one side and an adhesive face as the other side and a peel-off member that covers the adhesive face of the sealing member. The sealing member is configured by a transparent film. However, the sealing member needs not be formed of a transparent member and may be formed of a semi-transparent member. In addition, the medium may not be a sealing sheet and may be a transparent film that does not have any adhesive face.

This printing material is acquired by printing four images so as to be overlapped with one another on the medium. An image that is printed first on the medium is a mirrored image ABC. On the mirrored image ABC, two white images are printed. In addition, an image that is printed on the white images is the image XYZ. In other words, this printing material is acquired from forming a first layer of the mirrored image ABC, second and third layers of the white images, and a fourth layer of the image XYZ so as to be overlapped with one another.

When the peel-off member of this printing material is removed, and the adhesive face of the sealing member, for example, is attached to a window from the indoor side, characters of "XYZ" can be seen from the indoor side, and characters of "ABC" can be seen from the outdoor side through the sealing member (the characters "ABC" can be seen from a side of the sealing member that is located opposite to the printing face). In other words, the images of this printing material can be seen from both sides. When the printing material is used as described above, the sealing member is configured to be a transparent or semi-transparent member, and the image of the first layer is a mirrored image.

According to the ninth embodiment, a plurality of the white images is formed so as to be overlapped with one another, and thereby the thickness of the layers of the white images is larger than that of the seventh embodiment. Therefore, according to the ninth embodiment, compared to the seventh embodiment, it is difficult for the image XYZ to be transmitted when the characters "ABC" are seen from the outdoor side. On the contrary, it is difficult for the mirrored image ABC to be transmitted when the characters "XYZ" are seen from the indoor side.

Printing Method According to Ninth Embodiment

Figure 28B:
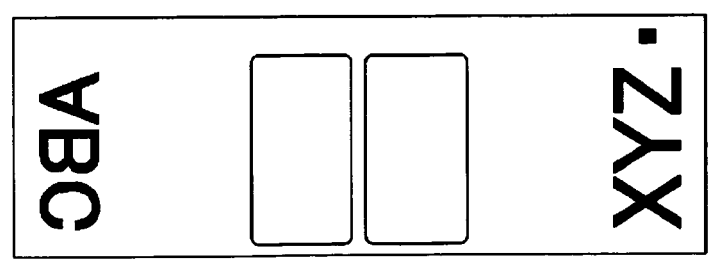
FIG. 28B is an explanatory diagram of image data that is used for a printing operation according to the ninth embodiment.

FIG. 28B is an explanatory diagram of image data that is used for a printing operation according to the ninth embodiment. As shown in the figure, the image data includes a mirrored image ABC to be printed in the area A, two white images to be printed in the areas C and D, and an image XYZ to be printed in the area F. In addition, the white image printed in the area C becomes the white image of the second layer, the white image printed in the area D becomes the white image of the third layer. In addition, the image data also includes a mark to be printed in the area F.

Figure 29:
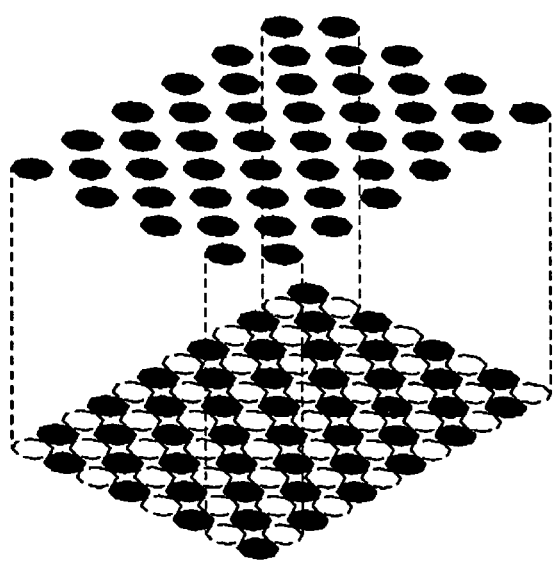
FIG. 29 is an explanatory diagram showing the configuration of two white images according to the ninth embodiment.

FIG. 29 is an explanatory diagram showing the configuration of two white images according to the ninth embodiment. In the figure, a black circle represents a dot of white ink. In this modified example, dots of white ink are not formed for the entire pixels (not forming so-called a beta image), and dots are formed in a check pattern. In addition, two white images in the image data are set such that in a pixel, in which a dot is not formed in one white image, a dot of the other white image is formed.

Figure 30:
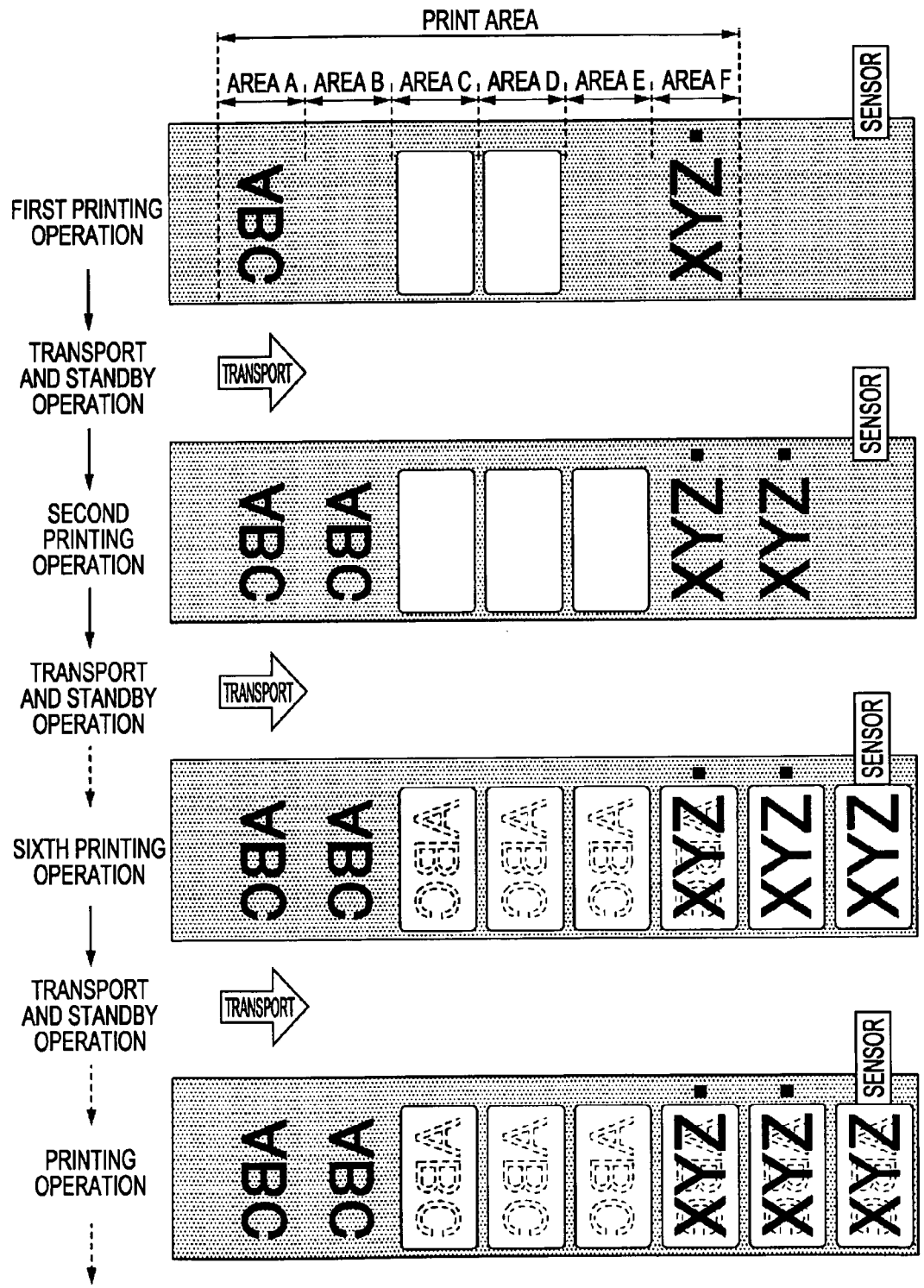
FIG. 30 is an explanatory diagram of a printing method according to a ninth embodiment of the invention.

FIG. 30 is an explanatory diagram of a printing method according to the ninth embodiment. As described below, according to the ninth embodiment, a printer repeats a printing operation that is performed based on the image data shown in FIG. 28B and a transport operation of a transport amount corresponding to a length of one printing material.

First, in a first printing operation, the printer 1 prints the mirrored image ABC in the area A while moving the head 31 in the moving direction. In addition, the printer 1 prints the white images in the areas C and D that are located on the downstream side of the area A in the transport direction and prints the image XYZ in the area F that is located on the downstream side of the areas C and D. In addition, in the first printing operation, a mark is printed in the area F.

After the first printing operation is performed, the printer 1 transports the medium by a transport amount corresponding to a length of one printing material (transport operation). This transport operation is performed as a standby operation for drying the mirrored image ABC or the white images, as well. By performing this transport operation, a medium on which any image has not been printed is transported to the area A, the mirrored image ABC that has been printed in the area A in the first printing operation is transported to the area B, and the white images printed in the areas C and D in the first printing operation are transported to areas in the vicinity of the downstream side thereof in the transport direction.

In the second printing operation, the printer 1, same as in the first printing operation, prints the mirrored image ABC in the area A, prints the white images in the areas C and D, and prints the image XYZ in the area F. After performing the second printing operation, the printer 1 alternately repeats the same transport operation and the same printing operation.

In the sixth and subsequent printing operations, the printer 1, same as in the first printing operation, prints the mirrored image ABC in the area A, prints the white images in the areas B to E, and prints the image XYZ in the area F. However, in the sixth and subsequent printing operations, there is the mirrored image ABC in the area C, there is the white image of one layer that is printed on the mirrored image ABC in the area D, and there are the white images of two layers that are printed on the mirrored image ABC in the area F. Accordingly, by performing the fifth and subsequent printing operations, the white image of the first layer is printed on the mirrored image ABC in the area C, the white image of the second layer is printed on the mirrored image ABC in the area D, and one printing material is completed in the area F.

According to the ninth embodiment, one printing material is completed for each printing operation.

In the ninth embodiment, as in the above-described first embodiment, an image to be printed in the print area is the same in all the printing operations. Accordingly, in the memory 63 of the printer 1, only one type of the image data is stored.

In this ninth embodiment, one printing material is printed for each printing operation. Thus, compared to the seventh embodiment, the printing speed may be slowed down. However, in this ninth embodiment, a time until the white image is printed after the mirrored image ABC is printed is lengthened. Accordingly, the white image can be printed after the mirrored image ABC is sufficiently dried on the hot platen 41. In addition, according to this ninth embodiment, a time until the image XYZ is printed after the white image is printed is lengthened, and accordingly, the image XYZ can be printed after the white image is sufficiently dried on the hot platen 41.

In addition, according to the ninth embodiment, a time until a next white image is printed after a first white image is printed is shorter than a time until a white image is printed after a mirrored image ABC is printed or a time until an image XYZ is printed after a white image is printed. However, as shown in FIG. 29, in a pixel, in which a dot is not formed in one white image, a dot of the other white image is formed, and accordingly, even when the drying time is shortened, there is not the problem of spread. In addition, when dots that form the first white image and the next white image spread on each other, only ink of a same color is mixed, and therefore the image quality is not influenced negatively. In other words, according to the ninth embodiment, the white image (the white image printed in the area D) of the second layer that is printed immediately after the white image of the first layer (the white image printed in the area C) is printed. Accordingly, a time until the image XYZ is printed after the white image of the second layer is printed can be set to be long.

In addition, according to the ninth embodiment, the white image that is printed in the area C is not so-called a beta image and is configured by dots of a check pattern. In other words, according to the ninth embodiment, the amount of white ink discharged from a head at a time when the white image is printed in the area C can be decreased. Accordingly, since the first image (here, the mirrored image ABC) does not easily spread for a case where the white image is printed in the area C, the drying time can be shortened, and whereby the printing speed can be increased.

The transport amount of a transport operation according to the ninth embodiment is smaller than that according to the seventh embodiment. Therefore, according to the ninth embodiment, the drying mechanism 42 only needs to heat a medium in a range corresponding to one area (for example, the area A), and thereby power consumption can be decreased.

Other Embodiments

In the above-described embodiments, the printer has been mainly described. However, it is apparent that a printing apparatus, a recording apparatus, a liquid discharging apparatus, a printing method, a recording method, a method of discharging liquid, a printing system, a recording system, a computer system, a program, a storage medium having the program stored thereon, a method of manufacturing a printing material, and the like are disclosed therein.

In addition, the printer or the like as an embodiment of the invention has been described as one embodiment. However, the above-described embodiments are for gaining sufficient understanding of the invention and are not for purposes of limitation. It is apparent that the invention may be changed or modified without departing from the gist thereof, and equivalents thereof belong to the scope of the invention. In particular, embodiments described below belong to the scope of the invention.

<Printing Apparatus>

In the above-described embodiments, the image data is stored in the memory 63 of the printer 1. However, a memory storing the image data is not limited to the memory 63 of the printer 1. For example, the image data may be configured to be stored in a memory (not shown) of the external computer 110. In such a case, the printing apparatus is configured by the computer 110 and the printer 1. Even in such a case, there is an advantage that the amount of the image data to be stored can be decreased.

<Printer>

In the above-described printer, printing for the entire surface of the print area can be performed by moving the carriage once in the transport direction. However, the invention is not limited to such a printer. For example, the printer may be a printer performing a printing operation for the print area by moving the carriage two-dimensionally on the print area. When such a printer is used, compared to the above-described printer, a long time is required for the printing operation. However, in such a case, the size of the head can be reduced.

<Images>

In the above-described embodiments, the image ABC, the mirrored image ABC, the image XYZ, and the like are printed. However, the printed image is not limited to a character image and may be a diagram or the like.

In addition, in the above-described embodiment, a white image is printed as a background image for easy viewing of the image ABC and the like. However, the background image is not limited to the white image and may be an image of a different color. In addition, particularly when the image ABC is printed on a transparent medium, the image ABC can be easily recognized visually by the presence of the background image.

In addition, in the above-described embodiment, the white image, the base image, and the coating image have rectangular shapes. However, the shapes thereof are not limited to the rectangular shapes. For example, the shapes thereof may be the same as "ABC" in accordance with the image ABC and may be shapes in which ABC is positioned on the edges thereof.

In addition, the printed image may not be so-called a filled-out image (dots are formed for all the pixels).

<Printing Material>

As an example of the use of the printing material in which the mirrored image ABC and the image XYZ are printed, a case where the printing material is attached to a window or the like has been described. However, the use of the printing material is not limited thereto. For example, the printing material may be used as a tag. When a case where the printing material is used as the tag or the like is considered, it can be understood that the medium such as a sealing sheet that does not have an adhesive face can be used.

<Drying Mechanism>

In the above-described embodiment, the heating range of the drying mechanism 42 is configured to be changeable by the controller 60. However, a drying mechanism 42 (for example, the drying mechanism 42 having the heating range corresponding to three areas) having a small heating range can be prepared from the start. In such a case, the space can be saved, and costs can be reduced.

<Standby Operation and Transport Operation>

In the embodiments shown in FIGS. 8B and 8C, the standby operation is longer than the transport operation. Thus, the standby operation is shown to be performed continuously after completion of the transport operation. However, the timing of the transport operation during the standby operation is not limited thereto.

For example, the printing operation may be configured to be performed immediately after the transport operation by performing the standby operation after the printing operation and performing the transport operation thereafter. Alternatively, the standby operation may be configured to be performed before or after the transport operation.

What is claimed is:

1. A method of printing a plurality of printing materials on a medium for producing a printed material in which a second image is printed on a first image, the method comprising:
    printing the first image on the medium in a first area of a printing area and printing the second image on the medium in a second area of the printing area when moving a print head in a transport direction;
    transporting the first image that is printed on the medium in the first area of the printing area to the second area of the printing area by transporting the medium in the transport direction;
    moving the print head from the second area of the printing area back to the first area of the printing area after printing the second image; and
    alternately repeating the printing and the transporting,
    wherein the printing area is the area traversed by the print head as the print head moves in the transport direction,
    wherein the first area of the printing area and the second area of the printing area are non-overlapping and the second area of the printing area is located downstream of the first area of the printing area in the transport direction, and
    wherein the printing of the first and second images is based on a single type of image data that includes both the first image and the second image.

2. The method according to claim 1, wherein the single type of image data includes at least one of a plurality of the first images and a plurality of the second images, the plurality of the first images, if present, being printed on the medium in the first area of the printing area and the plurality of the second images, if present, being printed on the medium in the second area of the printing area, and wherein producing the printed material further comprises alternately repeating the printing of the first and second images in the respective first and second areas and transporting the first image to the second area.

3. The method according to claim 1, wherein one of the first image and the second image is a background image, and wherein the other of the first image and the second image is an image for using the background image as background.

4. The method according to claim 1, further comprising transporting the first image from the first area to an area disposed between the first area and the second area, and transporting the first image from the area between the first area and the second area to the second area thereafter.

5. The method according to claim 1, wherein a drying device that dries the printed material is disposed downstream of the second area in the transport direction, and wherein the drying device can change a drying range.

6. The method according to claim 1, wherein a support unit that dries the printed material while supporting the medium is disposed between the first area and the second area, or alternatively, at one of the first area and the second area.

7. The method according to claim 1, wherein the first image of the single type of image data is undivided, and the second image of the single type of image data is undivided.

8. The method according to claim 1, wherein the single type of image data includes a whole first image and a whole second image.

9. The method according to claim 1, wherein the single type of image data includes a third image that is different from the first and second images, wherein the third image is printed on the medium in a third area of the printing area, the third area being non-overlapping with respect to the first area and the second area and being located downstream of the second area in the transport direction, and wherein producing the printed material further comprises alternately repeating the printing of the first, second, and third images in the respective first, second, and third areas based on the single type of image data and transporting the first image to the second area and the second image to the third area.

10. The method according to claim 9, wherein, in the single type of image data, an interval between the second image and the third image is different from an interval between the first image and the second image.

11. The method according to claim 9, wherein the single type of image data includes a plurality of the second images, wherein the plurality of the second images is printed such that at least one image of the plurality of the second images overlaps at least another image of the plurality of the second images, and wherein the third image is printed on the plurality of the second images that overlap one another.

12. The method according to claim 11, when a following second image is printed on a previous second image, a dot forming position of the following second image is positioned differently than a dot forming position of the previous second image.

13. A printing apparatus comprising:
   a memory that stores a single type of image data that includes a first image and a second image;
   a printing unit that performs printing on a medium based on the single type of image data when moving in a transport direction;
   a transport unit that transports the medium in the transport direction;
   a controller configured to perform the following steps:
      printing the first image on the medium in a first area of a printing area and printing the second image on the medium in a second area of the printing area by moving the printing unit in the transport direction;
      transporting the first image printed on the medium in the first area of the printing area to the second area of the printing area by using the transport unit;
      moving the printing unit from the second area of the printing area back to the first area of the printing area after printing the second image; and
      alternately repeating the printing and the transporting,
   wherein the printing area is the area traversed by the printing unit as the printing unit moves in the transport direction, and
   wherein the first area of the printing area and the second area of the printing area are non-overlapping and the second area of the printing area is located downstream of the first area of the printing area in the transport direction.

* * * * *